United States Patent
Kaneko et al.

(10) Patent No.: US 11,620,097 B2
(45) Date of Patent: Apr. 4, 2023

(54) INFORMATION PROCESSING APPARATUS AND INFORMATION PROCESSING METHOD FOR DISPLAYING A FIGURE CORRESPONDING TO AN AUTONOMOUS MOVING BODY

(71) Applicant: SONY GROUP CORPORATION, Tokyo (JP)

(72) Inventors: Emika Kaneko, Kanagawa (JP); Hirotsugu Sato, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/424,037

(22) PCT Filed: Jan. 31, 2020

(86) PCT No.: PCT/JP2020/003603
§ 371 (c)(1),
(2) Date: Jul. 19, 2021

(87) PCT Pub. No.: WO2020/166373
PCT Pub. Date: Aug. 20, 2020

(65) Prior Publication Data
US 2022/0083302 A1    Mar. 17, 2022

(30) Foreign Application Priority Data
Feb. 15, 2019  (JP) .............. JP2019-025719

(51) Int. Cl.
*G06F 3/14*    (2006.01)
*B25J 5/00*    (2006.01)
(Continued)

(52) U.S. Cl.
CPC .............. *G06F 3/1423* (2013.01); *B25J 5/00* (2013.01); *G05D 1/021* (2013.01); *G09G 3/3208* (2013.01);
(Continued)

(58) Field of Classification Search
None
See application file for complete search history.

(56) References Cited

U.S. PATENT DOCUMENTS

2003/0191560 A1* 10/2003 Yokoo .................... G06N 3/006
                                                       318/568.11
2009/0218769 A1*  9/2009 Krzewicki ................ F41J 5/14
                                                       273/374
(Continued)

FOREIGN PATENT DOCUMENTS

JP    2003-205483 A    7/2003
JP    2003-340760 A    12/2003
(Continued)

*Primary Examiner* — Patrick F Valdez
(74) *Attorney, Agent, or Firm* — Paratus Law Group, PLLC

(57) ABSTRACT

There is provided an information processing apparatus and an information processing method capable of intuitively and easily indicating a state of feeling of the autonomous moving body to the user. The information processing apparatus includes a control unit that, according to a change in a position of the autonomous moving body sensed by a sensing unit that senses the position of the autonomous moving body and a feeling parameter indicating the feeling of the autonomous moving body, causes a display screen to display a figure corresponding to the autonomous moving body while changing a state of the figure. The present disclosure can be applied to, for example, an apparatus and the like that controls an autonomous moving body.

20 Claims, 28 Drawing Sheets

(51) Int. Cl.
*G05D 1/02* (2020.01)
*G09G 3/3208* (2016.01)
*H04N 9/31* (2006.01)

(52) U.S. Cl.
CPC ... *H04N 9/3179* (2013.01); *G09G 2320/0666* (2013.01); *G09G 2340/045* (2013.01); *G09G 2340/0464* (2013.01); *G09G 2354/00* (2013.01)

(56) References Cited

U.S. PATENT DOCUMENTS

| | | | | |
|---|---|---|---|---|
| 2013/0187929 | A1* | 7/2013 | Perez | A63F 13/42 345/473 |
| 2016/0346933 | A1 | 12/2016 | Lin et al. | |
| 2017/0032575 | A1* | 2/2017 | Yeoh | G06T 7/20 |

FOREIGN PATENT DOCUMENTS

| | | |
|---|---|---|
| JP | 2014-144514 A | 8/2014 |
| JP | 2019-000937 A | 1/2019 |
| JP | 2019-023835 A | 2/2019 |
| JP | 2019023835 A * | 2/2019 |
| WO | WO 2016/163530 A1 | 10/2016 |
| WO | WO 2017/164825 A2 | 9/2017 |
| WO | WO 2018/047426 A1 | 3/2018 |

* cited by examiner

FIG. 22

| | TYPE OF FEELING | SHAPE OF FIGURE | MOVEMENT OF FIGURE | COLOR OF FIGURE |
|---|---|---|---|---|
| A | Joy (JOY) | STABLE AND CIRCULAR SHAPE | BREATHING MOVEMENT SUGGESTIVE OF ANTICIPATION | YELLOW |
| B | Anticipation (ANTICIPATION) | STABLE AND CIRCULAR SHAPE | MOVEMENT WITH EXCITED RHYTHM | ORANGE |
| C | Anger (ANGER) | IRRITATED AND THORNY SHAPE | MOVEMENT THAT BREATHING GETS FAST (MOVEMENT IS FASTER THAN ANTICIPATION) | RED |
| D | Disgust (DISGUST) | LOOSE SHAPE HAVING FRUSTRATION OF HEART, DISGUST, AND DISCOMFORT | LOOSE MOVEMENT MOVEMENT WITH STABLE RHYTHM | PEACH |
| E | Sadness (SADNESS) | SHAPE INCLUDING MOISTURE | GRADUAL MOVEMENT WITH RISING AND FALLING FEELING MOVEMENT WITH SLOW RHYTHM | BLUE |
| F | Surprise (SURPRISE) | SHAPE THAT LOOKS LIKE BALLOON IS POPPED | MOVEMENT STOPPING IN SURPRISE | LIGHT BLUE |
| G | Fear (FEAR) | ROUGH SHAPE SHAPE HAVING FRICTION | MOVEMENT WITH ROUGH, FRUSTRATED, AND UNSETTLED MOOD | GREEN |
| H | Trust (TRUST) | STABLE, CIRCULAR, AND WELL-FORMED SHAPE | MOVEMENT THAT IS CALM AND DOES NOT MOVE MUCH | LIME GREEN |

FIG. 23

| PAIR OF FEELINGS | | TYPE OF FEELING | SHAPE OF FIGURE | MOVEMENT OF FIGURE | COLOR OF FIGURE |
|---|---|---|---|---|---|
| AE | A | Joy (JOY) | STABLE AND CIRCULAR SHAPE | BREATHING MOVEMENT SUGGESTIVE OF ANTICIPATION | YELLOW |
| | E | Sadness (SADNESS) | SHAPE INCLUDING MOISTURE | GRADUAL MOVEMENT WITH RISING AND FALLING FEELING MOVEMENT WITH SLOW RHYTHM | BLUE |
| BF | B | Anticipation (ANTICIPATION) | STABLE AND CIRCULAR SHAPE | MOVEMENT WITH EXCITED RHYTHM | ORANGE |
| | F | Surprise (SURPRISE) | SHAPE THAT LOOKS LIKE BALLOON IS POPPED | MOVEMENT STOPPING IN SURPRISE | LIGHT BLUE |
| CG | C | Anger (ANGER) | IRRITATED AND THORNY SHAPE | MOVEMENT THAT BREATHING GETS FAST (MOVEMENT IS FASTER THAN ANTICIPATION) | RED |
| | G | Fear (FEAR) | ROUGH SHAPE SHAPE HAVING FRICTION | MOVEMENT WITH ROUGH, FRUSTRATED, AND UNSETTLED MOOD | GREEN |
| DH | D | Disgust (DISGUST) | LOOSE SHAPE HAVING FRUSTRATION OF HEART, DISGUST, AND DISCOMFORT | LOOSE MOVEMENT MOVEMENT WITH STABLE RHYTHM | PEACH |
| | H | Trust (TRUST) | STABLE, CIRCULAR, AND WELL-FORMED SHAPE | MOVEMENT THAT IS CALM AND DOES NOT MOVE MUCH | LIME GREEN |

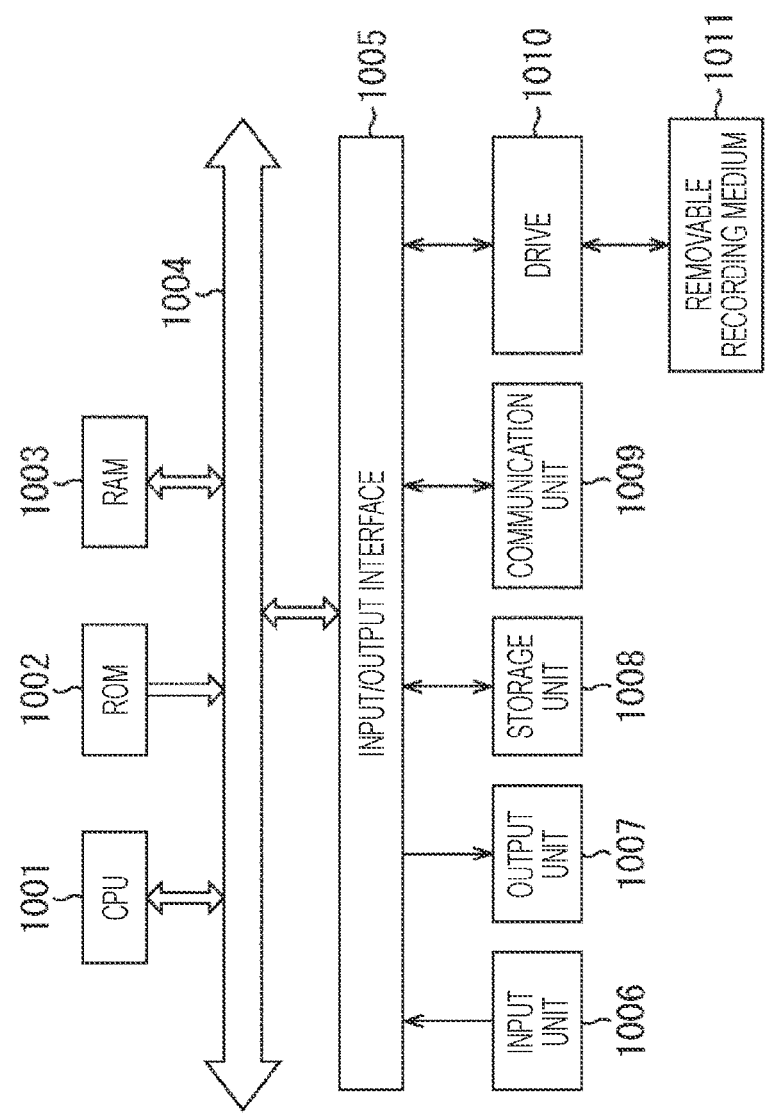

INFORMATION PROCESSING APPARATUS AND INFORMATION PROCESSING METHOD FOR DISPLAYING A FIGURE CORRESPONDING TO AN AUTONOMOUS MOVING BODY

CROSS REFERENCE TO PRIOR APPLICATION

This application is a National Stage Patent Application of PCT International Patent Application No. PCT/JP2020/003603 (filed on Jan. 31, 2020) under 35 U.S.C. § 371, which claims priority to Japanese Patent Application No. 2019-025719 (filed on Feb. 15, 2019), which are all hereby incorporated by reference in their entirety.

TECHNICAL FIELD

The present invention relates to an information processing apparatus and an information processing method.

BACKGROUND ART

In recent years, apparatuses that operate autonomously on the basis of various recognition processing have been developed. For example, Patent Document 1 discloses a robot apparatus that recognizes a state of an environment and a user and performs an action according to the state.

CITATION LIST

Patent Document

Patent Document 1: Japanese Patent Application Laid-Open No. 2003-340760

SUMMARY OF THE INVENTION

Problems to be Solved by the Invention

Here, in the autonomous moving body such as the robot apparatus described in Patent Document 1, it is important to accurately recognize the feedback of the user with respect to the executed action and correctly reflect the recognition result in the subsequent action. In the conventional technology, in a case where the autonomous moving body internally executes arithmetic processing, it is difficult to more intuitively present the changing state (what kind of feeling the autonomous moving body has) of the autonomous moving body to the user.

Therefore, the present disclosure proposes an information processing apparatus and an information processing method capable of intuitively and easily indicating a state of feeling of the autonomous moving body to the user.

Solutions to Problems

An information processing apparatus according to a first aspect of the present disclosure includes a control unit that, according to a change in a position of an autonomous moving body sensed by a sensing unit that senses the position of the autonomous moving body and a feeling parameter indicating a feeling of the autonomous moving body, causes a display screen to display a figure corresponding to the autonomous moving body while changing a state of the figure.

In an information processing method according to the first aspect of the present disclosure, an information processing apparatus causes, according to a change in a position of an autonomous moving body sensed by a sensing unit that senses the position of the autonomous moving body and a feeling parameter indicating a feeling of the autonomous moving body, a display screen to display a figure corresponding to the autonomous moving body while changing a state of the figure.

In the first aspect of the present disclosure, according to a change in a position of an autonomous moving body sensed by a sensing unit that senses the position of the autonomous moving body and a feeling parameter indicating a feeling of the autonomous moving body, a figure corresponding to the autonomous moving body is displayed on a display screen while changing a state of the figure.

An information processing apparatus according to a second aspect of the present disclosure includes a projection adjustment unit that, according to a change in a position of an autonomous moving body sensed by a sensing unit that senses the position of the autonomous moving body and a feeling parameter indicating a feeling of the autonomous moving body, adjusts projection light to be projected onto the autonomous moving body while changing a state of a figure corresponding to the autonomous moving body.

In an information processing method according to the second aspect of the present disclosure, an information processing apparatus adjusts, according to a change in a position of an autonomous moving body sensed by a sensing unit that senses the position of the autonomous moving body and a feeling parameter indicating a feeling of the autonomous moving body, projection light to be projected onto the autonomous moving body while changing a state of a figure corresponding to the autonomous moving body.

In the second aspect of the present disclosure, according to a change in a position of an autonomous moving body sensed by a sensing unit that senses the position of the autonomous moving body and a feeling parameter indicating a feeling of the autonomous moving body, projection light to be projected onto the autonomous moving body is adjusted while changing a state of a figure corresponding to the autonomous moving body.

Note that the information processing apparatus according to the first and second aspects of the present disclosure can be implemented by causing a computer to execute a program. The program to be executed by the computer can be provided by being transmitted via a transmission medium or by being recorded on a recording medium.

The information processing apparatus may be an independent apparatus or an internal block constituting one apparatus.

BRIEF DESCRIPTION OF DRAWINGS

FIG. 22 is a diagram illustrating a correspondence relation between a feeling parameter and a display form of the figure R1.

FIG. 23 is a diagram illustrating a correspondence relation between a feeling parameter and a display form of the figure R1.

FIG. 28 is a block diagram illustrating a configuration example of an embodiment of a computer to which the present disclosure is applied.

MODE FOR CARRYING OUT THE INVENTION

Hereinafter, a mode for carrying out the present disclosure (hereinafter, referred to as an embodiment) will be described.

<<Outline of Autonomous Moving Body 10>>

Figure 1:
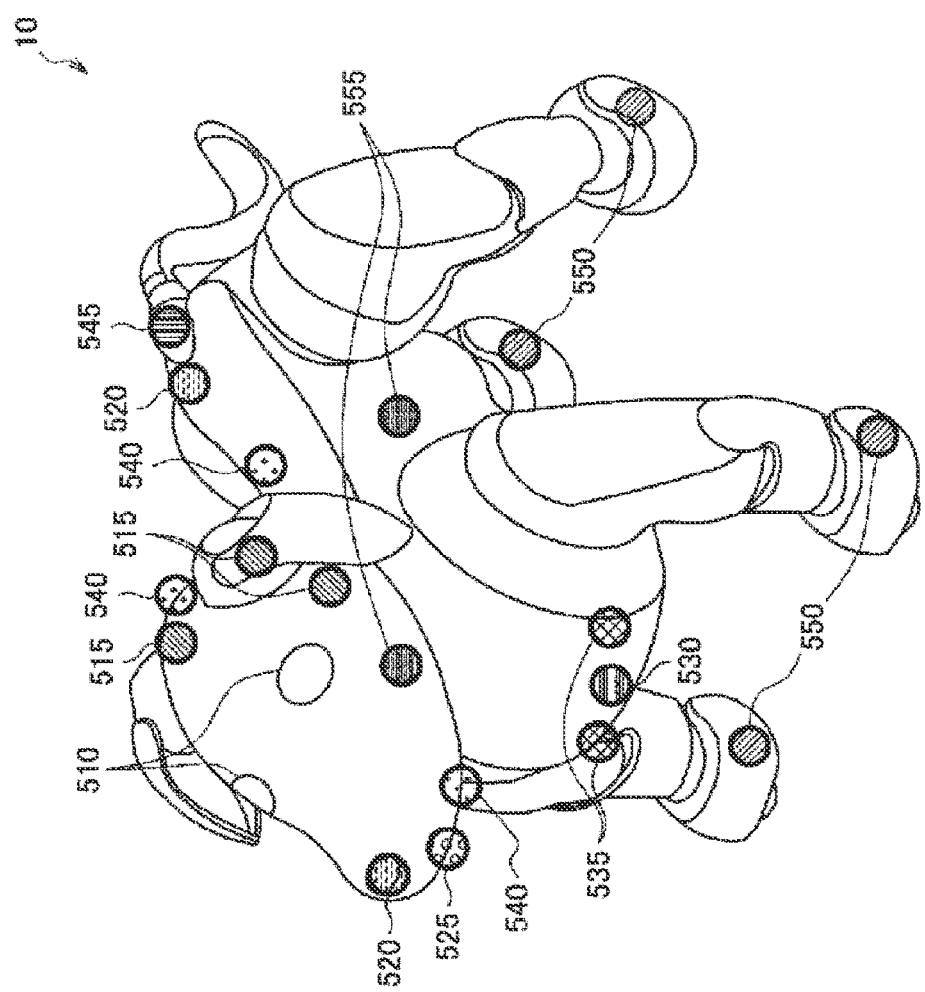
FIG. 1 is a diagram illustrating a hardware configuration example of an autonomous moving body according to an embodiment of the present disclosure.

FIG. 1 is a diagram illustrating a hardware configuration example of an autonomous moving body 10 according to an embodiment of the present disclosure.

First, an outline of the autonomous moving body 10 will be described. The autonomous moving body 10 is an information processing apparatus that executes circumstances estimation based on collected sensor information, and autonomously selects and performs various motions in accordance with the situation. One of the features of the autonomous moving body 10 is that the autonomous moving body autonomously executes an operation estimated to be optimal for each situation, unlike a robot that simply performs an operation according to a user's instruction command.

Therefore, there is a case where the autonomous moving body 10 according to an embodiment of the present disclosure may not intentionally execute a motion corresponding to the user's instruction or may execute another behavior different from the motion depending on the situation. The situation described above corresponds to, for example, a case where the safety of the user, the autonomous moving body 10, or the surrounding environment is impaired in a case where a motion corresponding to a user's instruction is performed, a case where the autonomous moving body 10 prioritizes another desire (instinct) such as charging processing, and the like.

Furthermore, there is a case where the autonomous moving body 10 intentionally does not follow the user's instruction to attempt to trigger the interest of the user or attempt to transmit its own feeling or the state of the hardware to the user.

On the other hand, the autonomous moving body 10 has a strong desire (instinct) to be loved by the user. Therefore, the autonomous moving body 10 repeatedly executes a motion corresponding to a user's instruction in order to please the user, or learns a motion that the user likes to spontaneously execute the motion even in a case where there is no instruction.

As described above, the autonomous moving body 10 according to an embodiment of the present disclosure determines and executes the autonomous motion by comprehensively determining a desire, a feeling, a surrounding environment, and the like, similarly to an animal including a human. In the point described above, the autonomous moving body 10 is clearly different from a passive apparatus that executes a corresponding operation or processing on the basis of an instruction.

The autonomous moving body 10 according to an embodiment of the present disclosure may be an autonomous moving robot that autonomously moves in a space and executes various motions. The autonomous moving body 10 may be, for example, an autonomous moving robot that has a shape imitating a human being or an animal such as a dog and motional ability. Furthermore, the autonomous moving body 10 may be, for example, a vehicle or another apparatus capable of communicating with the user. The level of shape, ability, desire, and the like of the autonomous moving body 10 according to an embodiment of the present disclosure can be appropriately designed according to a purpose and a role.

<<Hardware Configuration Example of Autonomous Moving Body 10>>

Next, a hardware configuration example of the autonomous moving body 10 will be described. Note that, in the following, a case where the autonomous moving body 10 is a dog-type quadruped walking robot will be described as an example.

As illustrated in FIG. 1, the autonomous moving body 10 is a dog-type quadruped walking robot having a head, a body, four legs, and a tail. Furthermore, the autonomous moving body 10 includes two displays 510 on the head.

Furthermore, the autonomous moving body 10 includes various sensors. The autonomous moving body 10 includes, for example, a microphone 515, a camera 520, a time of flight (ToF) sensor 525, a motion sensor 530, a position-sensitive detector (PSD) 535 sensor, a touch sensor 540, an illuminance sensor 545, a sole button 550, and an inertia sensor 555.

(Microphone 515)

The microphone 515 has the function of collecting surrounding sound. The sound described above includes, for example, an utterance of the user and surrounding environmental sounds. The autonomous moving body 10 may include, for example, four microphones on the head. By providing a plurality of microphones 515, it is possible to collect sounds generated in the surroundings with high sensitivity and to realize a fix of a sound source.

(Camera 520)

The camera 520 has the function of imaging the user and the surrounding environment. The autonomous moving body 10 may include, for example, two wide-angle cameras at the nose tip and the waist. In this case, the wide-angle camera arranged at the nose tip captures an image corresponding to a front visual field of the autonomous moving body (that is, the visual field of the dog), and the wide-angle camera of the waist captures an image of a surrounding region centered on the upper side. The autonomous moving body 10 can extract a characteristic point of the ceiling and the like on the basis of an image captured by the wide-angle camera arranged on the waist, for example, and can realize simultaneous localization and mapping (SLAM).

(ToF Sensor 525)

The ToF sensor 525 has the function of detecting a distance to an object present in front of the head. The ToF sensor 525 is provided at the nose tip of the head. According to the ToF sensor 525, distances to various objects can be detected with high accuracy, and a motion according to a relative position with respect to a target including a user, an obstacle, or the like can be realized.

(Motion Sensor 530)

The motion sensor 530 has the function of sensing the whereabouts of the user, a pet raised by the user, or the like. The motion sensor 530 is, for example, arranged on the chest. According to the motion sensor 530, by sensing a moving object present ahead, it is possible to realize various motions with respect to the moving object, for example, motions according to feelings such as interest, fear, surprise, and the like.

(PSD Sensor 535)

The PSD sensor 535 has the function of acquiring a situation of a floor surface ahead of the autonomous moving body 10. The PSD sensor 535 is, for example, arranged on the chest. According to the PSD sensor 535, the distance to the object present on the floor surface ahead of the autonomous moving body 10 can be detected with high accuracy, and a motion according to a relative position with respect to the object can be realized.

(Touch Sensor 540)

The touch sensor 540 has the function of sensing a touch by the user. The touch sensor 540 is arranged at a portion where the user is likely to touch the autonomous moving body 10, for example, such as the top of the head, under the chin, or the back. The touch sensor 540 may be, for example, a capacitive or pressure-sensitive touch sensor. According to the touch sensor 540, it is possible to sense a touch action such as touching, stroking, hitting, pushing, or the like by the user, and it is possible to perform a motion according to the touch action (Illuminance Sensor 545)

The illuminance sensor 545 detects illuminance of a space in which the autonomous moving body 10 is located. The illuminance sensor 545 may be arranged, for example, at the base of the tail or the like on the back surface of the head. According to the illuminance sensor 545, it is possible to detect surrounding brightness and execute a motion according to the brightness.

(Sole Button 550)

The sole button 550 has the function of sensing whether or not the bottom of a leg portion of the autonomous moving body 10 contacts the floor. For this purpose, the sole buttons 550 are arranged on each portion corresponding to the paw pads of the four leg portions. According to the sole button 550, it is possible to sense contact or non-contact between the autonomous moving body 10 and the floor surface, and, for example, it is possible to grasp that the autonomous moving body 10 has been lifted in the arms of the user and the like.

(Inertia Sensor 555)

The inertia sensor 555 is a six-axis sensor that detects physical quantities, such as speed, acceleration, and rotation of the head or the body. That is, the inertia sensor 555 detects acceleration and angular velocity on the X axis, the Y axis, and the Z axis. The inertia sensor 555 is arranged at each of the head and the body. According to the inertia sensor 555, movements of the head and the body of the autonomous moving body 10 can be detected with high accuracy, and the motion control according to the situation can be realized.

An example of the sensor included in the autonomous moving body 10 according to an embodiment of the present disclosure has been described above. Note that the configuration described above described with reference to FIG. 1 is merely an example, and the configuration of the sensor that can be included in the autonomous moving body 10 is not limited to such an example. The autonomous moving body 10 may further include, in addition to the configuration described above, for example, various communication devices and the like including a temperature sensor, a geomagnetic sensor, and a Global Navigation Satellite System (GNSS) signal receiver. The configurations of sensors that the autonomous moving body 10 includes may be flexibly varied according to the specification and use.

Figure 2:
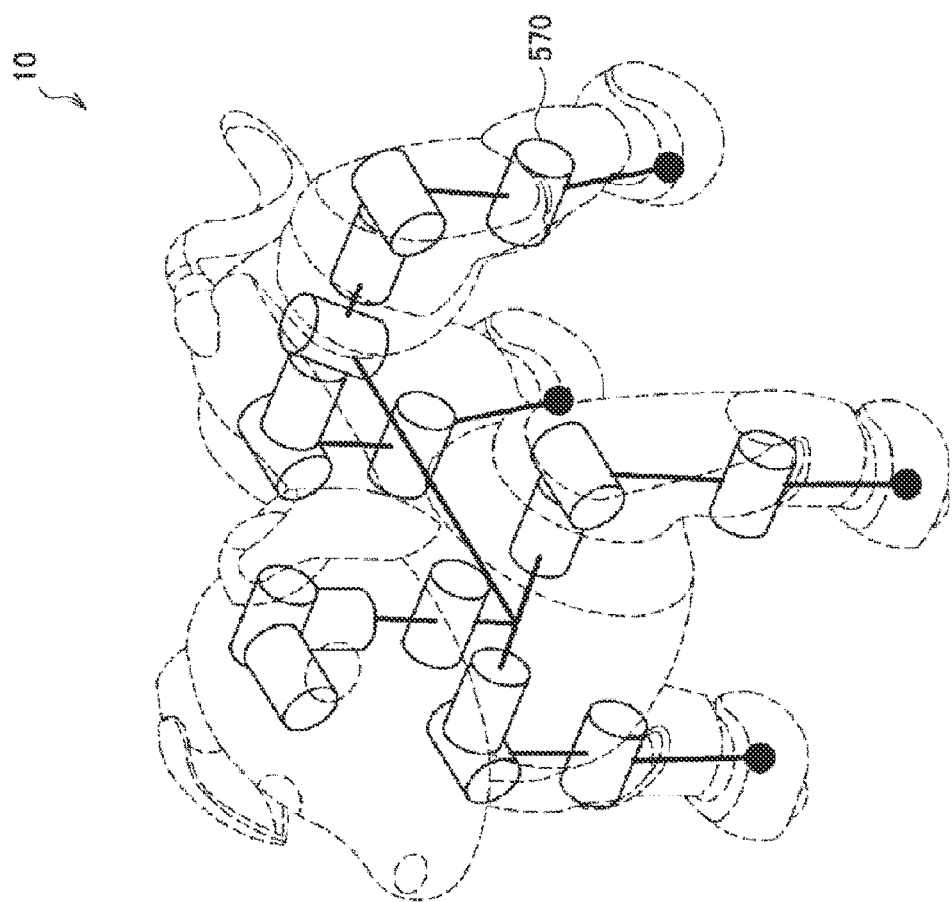
FIG. 2 is a configuration example of an actuator included in the autonomous moving body according to an embodiment of the present disclosure.

Next, a configuration example of a joint portion of the autonomous moving body 10 will be described. FIG. 2 is a configuration example of an actuator 570 included in the autonomous moving body 10 according to an embodiment of the present disclosure. The autonomous moving body 10 according to an embodiment of the present disclosure has 22 degrees of freedom of rotation in total including, in addition to degrees of freedom of rotation in rotating portions illustrated in FIG. 2, two degrees of freedom of rotation in each of the pair of ears and the tail portion, and one degree of freedom of rotation in the mouth.

For example, the autonomous moving body 10 has three degrees of freedom in the head and thus enables both motions of nodding and tilting the head. Furthermore, the autonomous moving body 10 enables the realization of natural and flexible motions closer to those of a real dog by reproducing swing operations of the waist using the actuator 570 provided at the waist portion.

Note that the autonomous moving body 10 according to an embodiment of the present disclosure may realize the 22 degrees of freedom of rotation described above by combining a single-axis actuator and a two-axis actuator for example. For example, single-axis actuators may be used for the elbows and knees of the leg portions, and two-axis actuators may be used for the shoulders and the bases of thighs, respectively.

Figure 3:
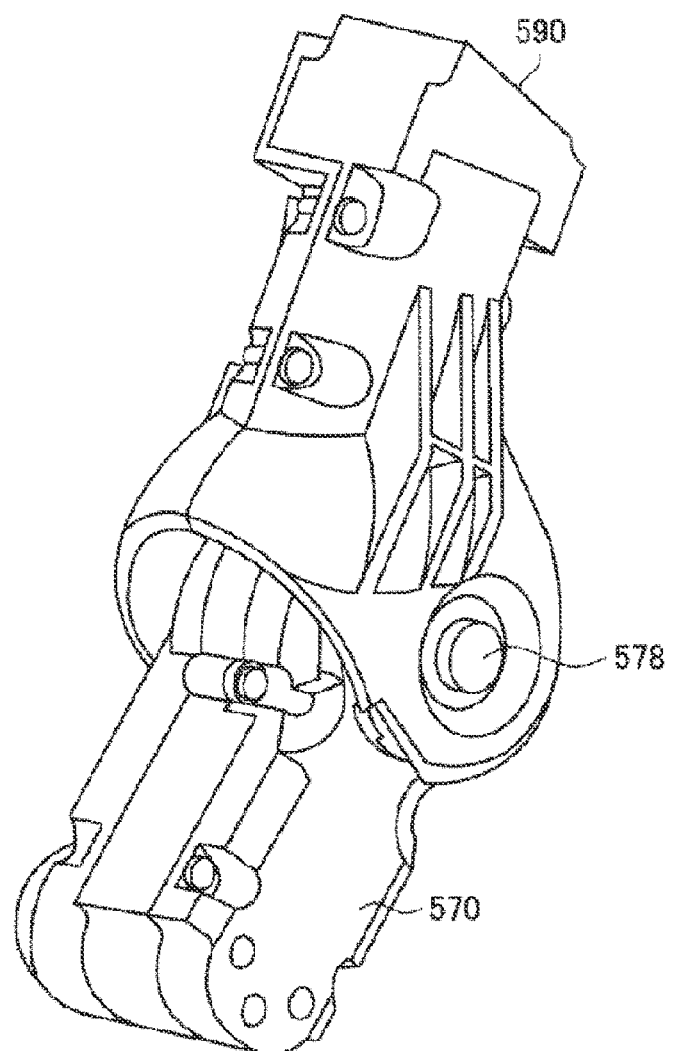
FIG. 3 is a diagram for explaining a motion of the actuator included in the autonomous moving body according to an embodiment of the present disclosure.
Figure 4:
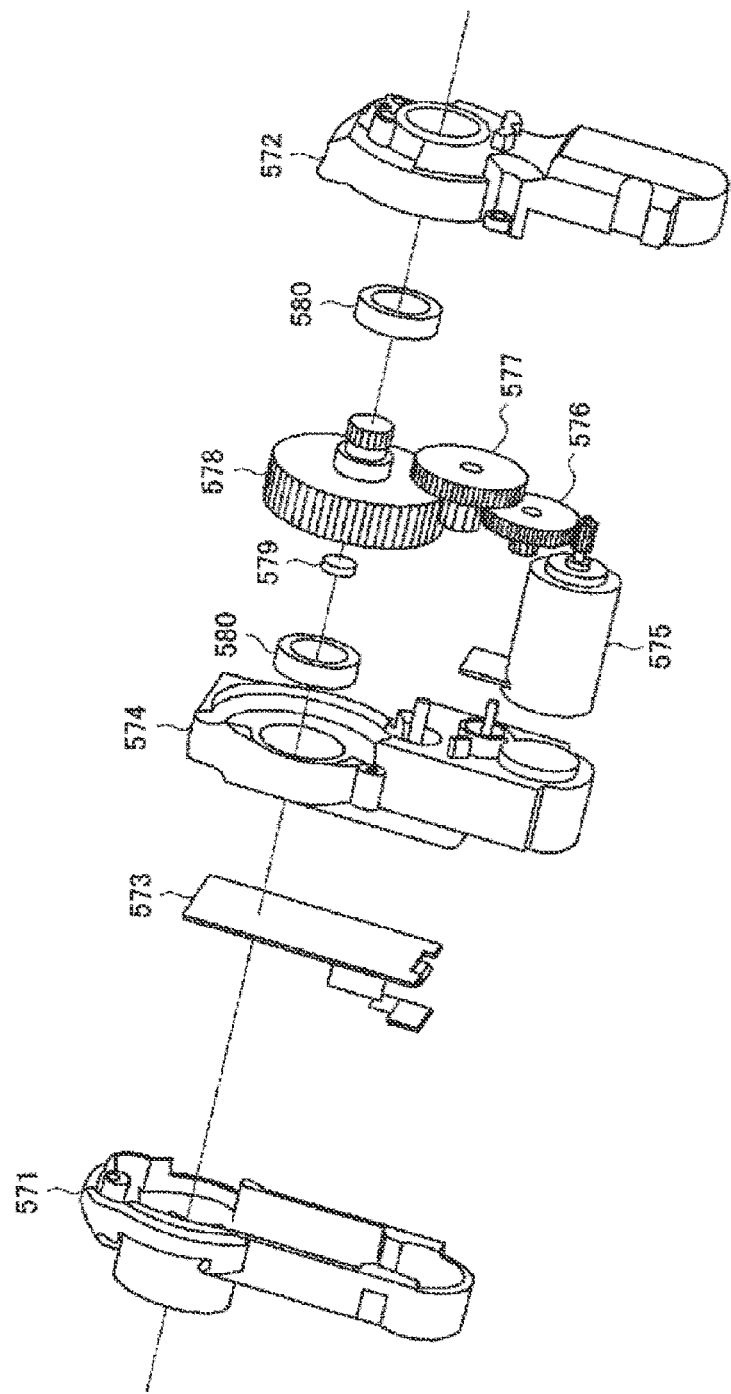
FIG. 4 is a diagram for explaining a motion of the actuator included in the autonomous moving body according to an embodiment of the present disclosure.

FIGS. 3 and 4 are diagrams for explaining a motion of the actuator 570 included in the autonomous moving body 10 according to an embodiment of the present disclosure. Referring to FIG. 3, by rotating an output gear using a motor 575, the actuator 570 enables a movable arm 590 to be driven at a given rotational position and a rotational speed.

Referring to FIG. 4, the actuator 570 includes a rear cover 571, a gearbox cover 572, a control board 573, a gearbox base 574, the motor 575, a first gear 576, a second gear 577, an output gear 578, a detection magnet 579, and two bearings 580.

The actuator 570 may be, for example, a magnetic spin-valve giant magnetoresistive (svGMR). The control board 573 causes the motor 575 to rotate on the basis of the control by a main processor, so that power is transmitted to the output gear 578 via the first gear 576 and the second gear 577, and accordingly the movable arm 590 can be driven.

Furthermore, the position sensor included in the control board 573 detects a rotation angle of the detection magnet 579 that rotates in synchronization with the output gear 578, whereby the rotation angle, that is, the rotational position of the movable arm 590 can be detected with high accuracy.

Note that the magnetic svGMR employs a non-contact system and thus has excellent durability and the magnetic svGMR is used in a GMR saturated area and thus has an advantage in that effects of signal variations resulting from variations in distance between the detection magnet 579 and the position sensor are small.

The configuration example of the actuator 570 included in the autonomous moving body 10 according to an embodiment of the present disclosure has been described above. According to the configuration described above, bending and stretching motions of the joint portions included in the autonomous moving body 10 can be controlled with high accuracy, and the rotational positions of the joint portions can be accurately detected.

Figure 5:
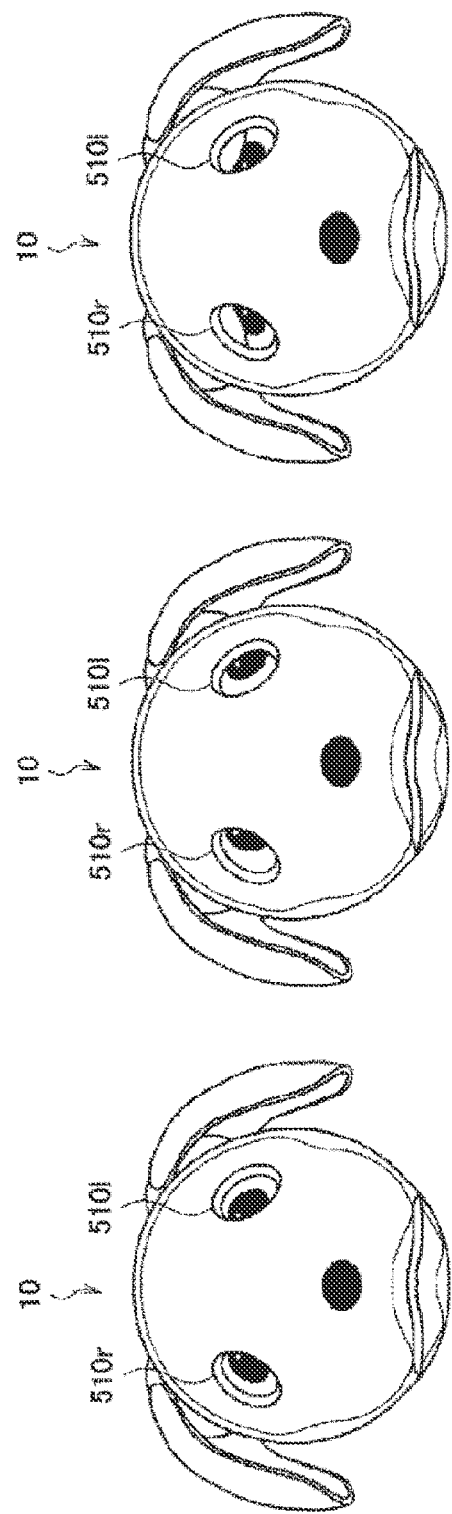
FIG. 5 illustrates a function of a display included in an autonomous moving body according to an embodiment of the present disclosure.

Next, a function of the display 510 included in the autonomous moving body 10 according to an embodiment of the present disclosure will be described with reference to FIG. 5. FIG. 5 is a diagram for describing a function of the display 510 included in the autonomous moving body 10 according to an embodiment of the present disclosure.

(Display 510)

The display 510 has the function of visually expressing motions of eyes and feelings of the autonomous moving body 10. As illustrated in FIG. 5, the display 510 can express motions of eyeballs, pupils, and eyelids according to a feeling and motion. The display 510 produces natural motions close to those of an existing animal such as a dog by intentionally not displaying texts, symbols, images not related to eyeball movements, and the like.

Furthermore, as illustrated in FIG. 5, the autonomous moving body 10 includes two displays 510r and 510l corresponding to each of the right eye and the left eye. The displays 510r and 510l are realized by, for example, two independent organic light emitting diodes (OLEDs). According to the OLED, it is possible to reproduce the curved surface of the eyeball, and it is possible to realize a more natural exterior compared to the case where a pair of eyeballs is expressed using a single planar display or the case where the two eyeballs are expressed respectively using two independent planar displays.

As described above, according to the displays 510r and 510l, it is possible to express the line-of-sight and feelings of the autonomous moving body 10 as illustrated in FIG. 5 with high accuracy and flexibility. Furthermore, the user can intuitively grasp the condition of the autonomous moving body 10 from motions of eyeballs displayed on the display 510.

Figure 6:
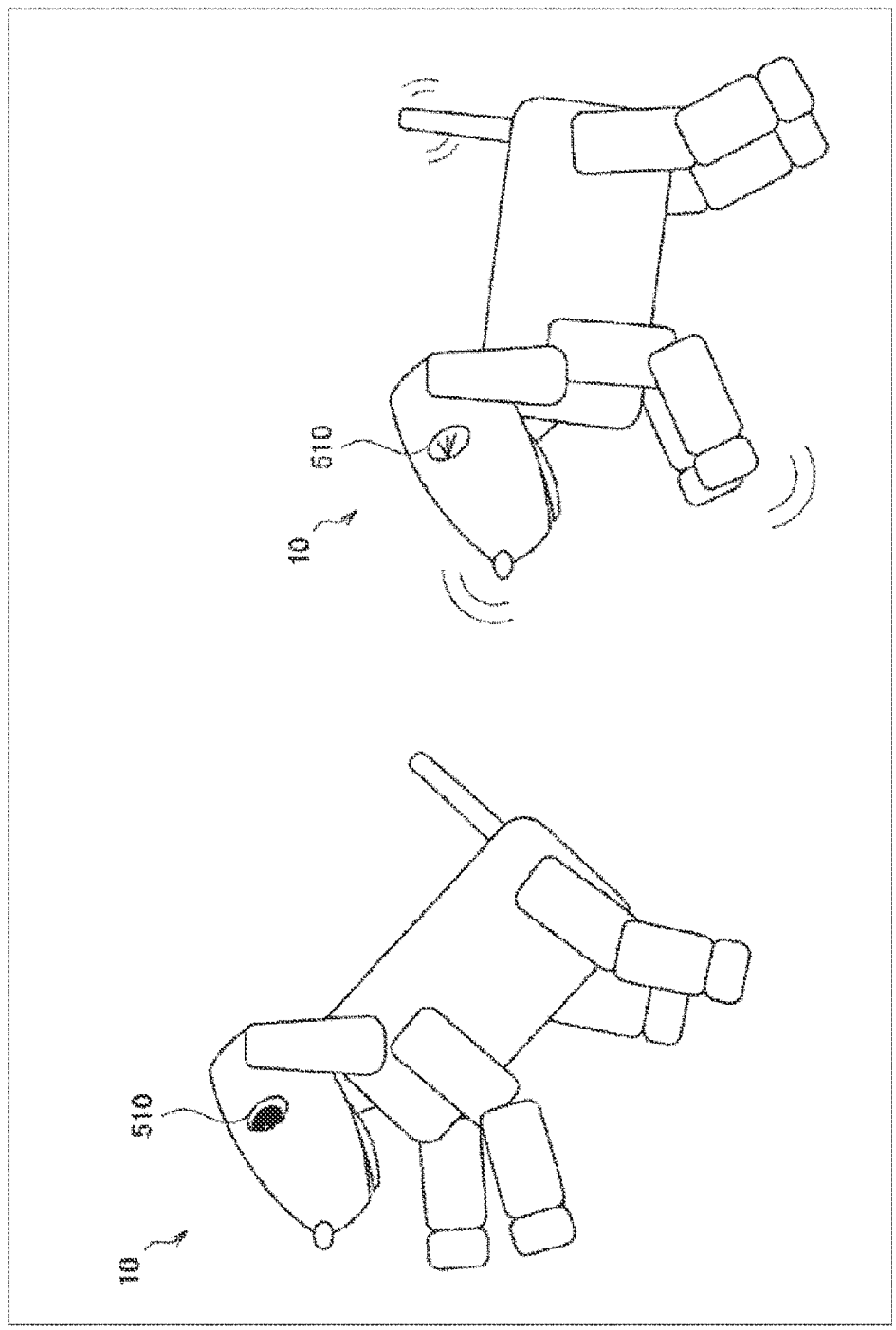
FIG. 6 is a diagram illustrating an operation example of the autonomous moving body according to an embodiment of the present disclosure.

The hardware configuration example of the autonomous moving body 10 according to an embodiment of the present disclosure has been described above. According to the configuration described above, as illustrated in FIG. 6, by controlling the motions of the joint portions and the eyeballs of the autonomous moving body 10 with high accuracy and flexibility, it is possible to realize motions and expressions of feeling closer to those of an existing living thing. Note that FIG. 6 is a diagram illustrating a motion example of the autonomous moving body 10 according to an embodiment of the present disclosure, but in FIG. 6, the external structure of the autonomous moving body 10 is illustrated in a simplified manner in order to perform description focusing on motions of the joint portions and the eyeballs of the autonomous moving body 10. Similarly, in the following description, there is a case where the external structure of the autonomous moving body 10 is illustrated in a simplified manner, but the hardware configuration and the exterior of the autonomous moving body 10 according to an embodiment of the present disclosure are not limited to the example illustrated in the drawings and may be appropriately designed.

<<System Configuration Example>>

Figure 7:
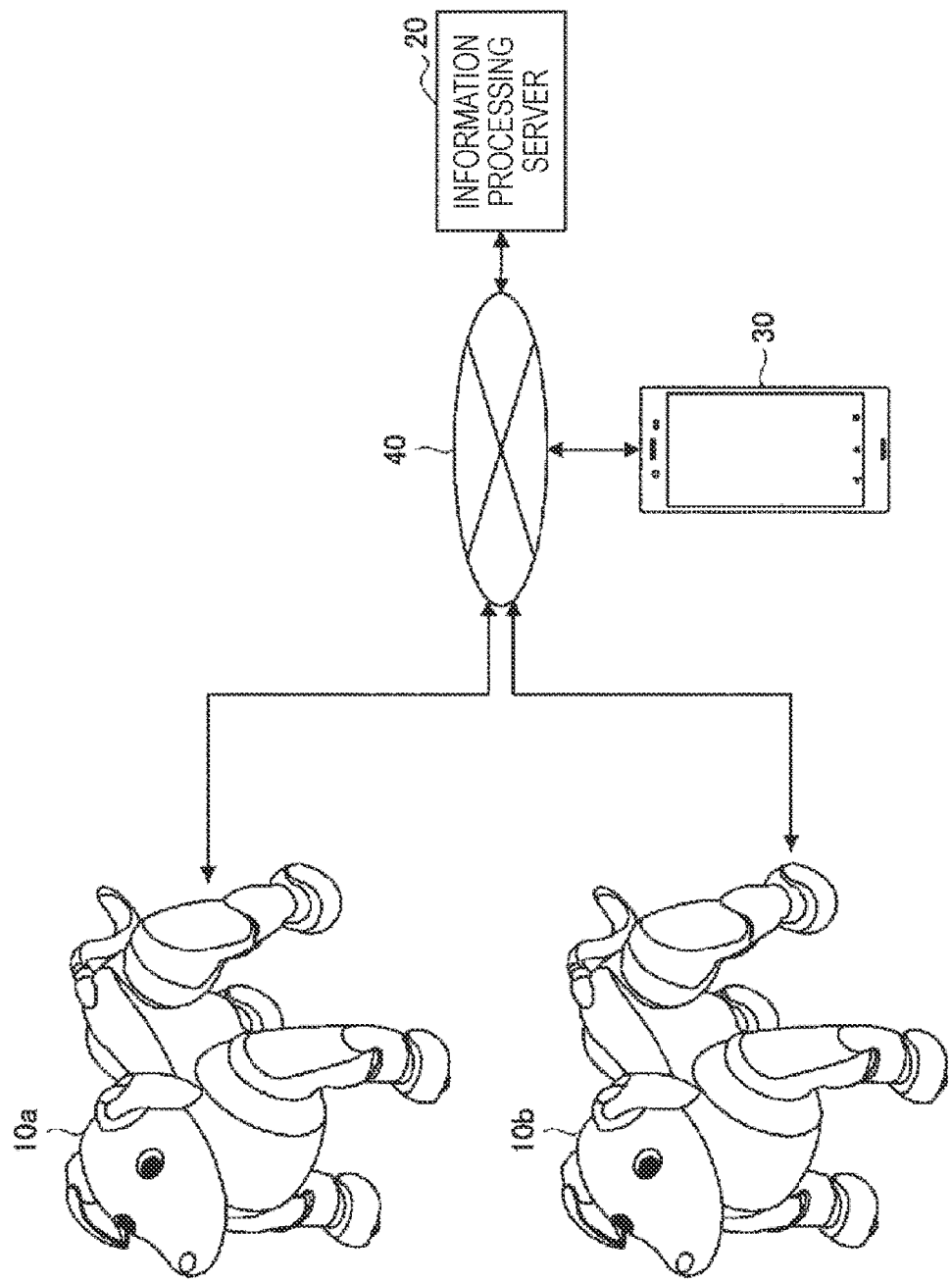
FIG. 7 is a diagram illustrating an example of a system configuration according to an embodiment of the present disclosure.

Next, a system configuration example according to an embodiment of the present disclosure will be described. FIG. 7 is a diagram illustrating an example of a system configuration according to an embodiment of the present disclosure. Referring to FIG. 7, an information processing system according to an embodiment of the present disclosure includes a plurality of autonomous moving bodies 10, an information processing server 20, and an information processing terminal 30. Note that each of the components included in the information processing system is connected so as to be able to communicate with each other via the network 40.

(Autonomous Moving Body 10)

The autonomous moving body 10 according to an embodiment of the present disclosure is an information processing apparatus that executes circumstances estimation on the basis of collected sensor information and autonomously selects and executes various motions in accordance with the situation. As described above, the autonomous moving body 10 according to an embodiment of the present disclosure may be, for example, an autonomous moving robot that has a shape imitating a human being or an animal such as a dog and motional ability.

(Information Processing Server 20)

The information processing server 20 according to an embodiment of the present disclosure is an information processing apparatus that is connected to a plurality of autonomous moving bodies 10 and has the function of collecting various types of information from the autonomous moving body 10. For example, the information processing server 20 can perform analysis and the like related to a condition of hardware of the autonomous moving body 10 and a degree of enthusiasm of the user for the autonomous moving body 10 from the sensor information collected by the autonomous moving body 10.

Furthermore, on the basis of the situation estimated by the autonomous moving body 10, the information processing server 20 has the function of presenting a recommended action that should be performed by the autonomous moving body 10 in the situation. At this time, the information processing server 20 may transmit, to the autonomous moving body 10, control sequence data for causing the autonomous moving body 10 to realize the recommended action.

Furthermore, the information processing server 20 according to an embodiment of the present disclosure performs operation control of an application related to communication between the autonomous moving body 10 and the user. For example, the information processing server 20 may dynamically perform control related to an output expression of an avatar reflecting the condition of the autonomous moving body 10 on the application. Furthermore, the information processing server 20 has the function of reflecting the user's operation on the avatar described above to the autonomous moving body 10. According to the function of the information processing server 20 described above, it is possible to realize, independently of the whereabouts of the autonomous moving body 10 and the user, communication between both parties.

(Information Processing Terminal 30)

An information processing terminal 30 according to an embodiment of the present disclosure is an information processing apparatus that provides a user with a user interface related to the above-described application. The information processing terminal 30 according to an embodiment of the present disclosure can be, for example, a mobile phone, a smartphone, a tablet, various wearable devices, a general-purpose computer, or the like possessed by a user.

(Network 40)

The network 40 has the function of connecting each component included in the information processing system. The network 40 may include a public line network such as the Internet, a telephone line network, and a satellite communication network, various local area networks (LANs) including Ethernet (registered trademark), a wide area network (WAN), and the like. Furthermore, the network 40 may include a dedicated line network such as an Internet protocol-virtual private network (IP-VPN). Furthermore, the network 40 may include a wireless communication network such as Wireless Fidelity (Wi-Fi) (registered trademark) and Bluetooth (registered trademark).

The system configuration example according to an embodiment of the present disclosure has been described above. Note that the configuration described above with reference to FIG. 7 is merely an example, and the configuration of the information processing system according to an embodiment of the present disclosure is not limited to such an example. For example, the autonomous moving body 10 may further perform information communication with various external apparatuses in addition to the information processing server 20. The external apparatus described above may include, for example, a server that transmits weather, news, and other service information, various information processing terminals possessed by the user, home appliances, and the like. The system configuration according to an embodiment of the present disclosure can be flexibly modified according to specifications and uses.

<<Functional Configuration Example of Autonomous Moving Body 10>>

Figure 8:
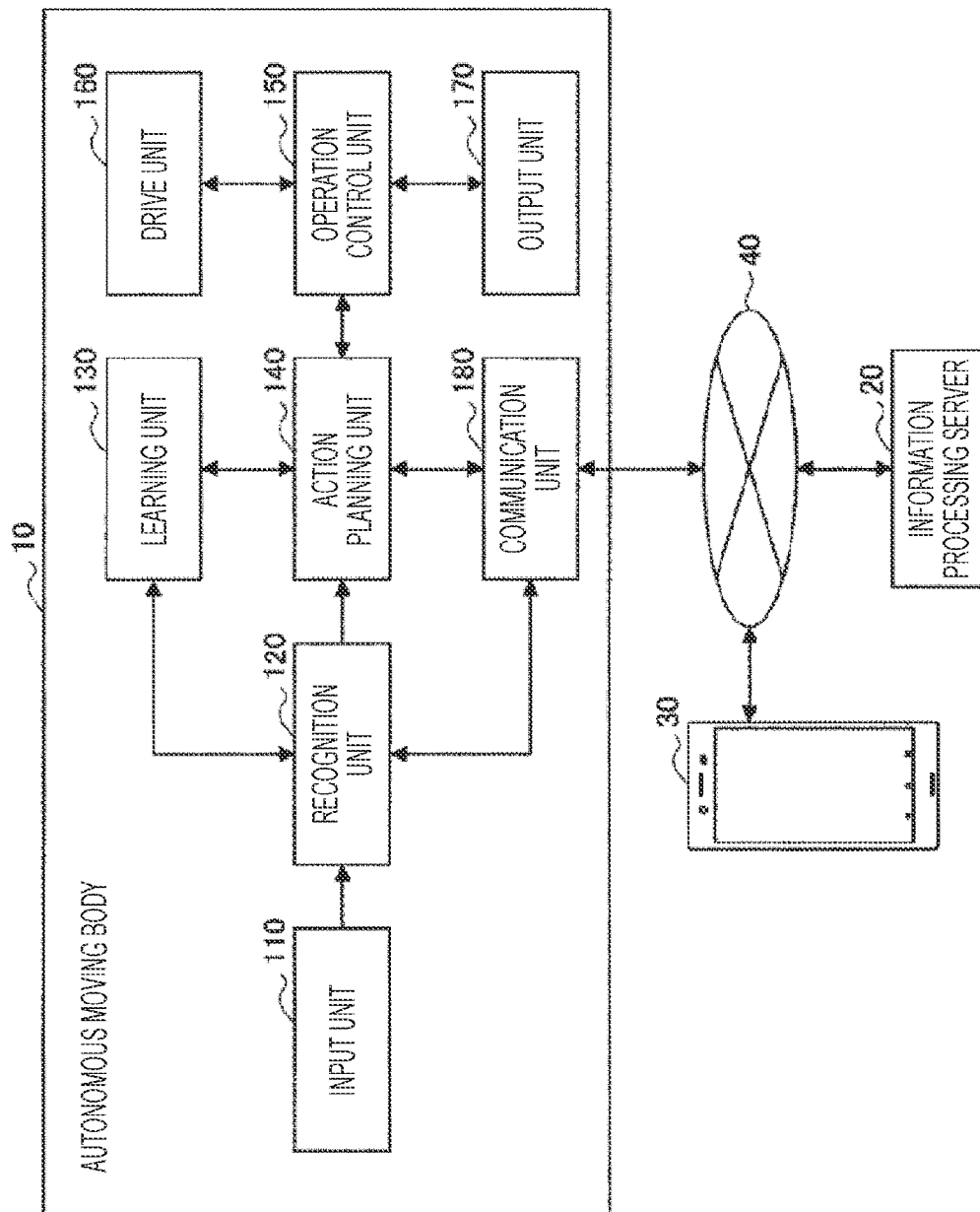
FIG. 8 is a diagram illustrating a functional configuration example of the autonomous moving body according to an embodiment of the present disclosure.

Next, a functional configuration example of the autonomous moving body 10 according to an embodiment of the present disclosure will be described. FIG. 8 is a diagram illustrating a functional configuration example of the autonomous moving body 10 according to an embodiment of the present disclosure. Referring to FIG. 8, the autonomous moving body 10 according to an embodiment of the present disclosure includes an input unit 110, a recognition unit 120, a learning unit 130, an action planning unit 140, an operation control unit 150, a drive unit 160, an output unit 170, and a communication unit 180.

(Input Unit 110)

The input unit 110 has the function of collecting various types of information regarding the user and the surrounding environment. The input unit 110 collects, for example, the utterance of the user, environmental sound occurring around, image information regarding the user and the surrounding environment, and various types of sensor information. For this purpose, the input unit 110 includes various sensors illustrated in FIG. 1.

(Recognition Unit 120)

The recognition unit 120 has the function of performing various types of recognition related to the user, the surrounding environment, and the condition of the autonomous moving body 10 on the basis of the various types of information collected by the input unit 110. In an example, the recognition unit 120 may identify a person, recognize the expression or a line-of-sight, recognize an object, recognize color, recognize a shape, recognize a marker, recognize an obstacle, recognize a step, recognize brightness, and the like.

Furthermore, the recognition unit 120 recognizes feelings, understands words, localizes a sound source, and the like related to the voice of the user. Furthermore, the recognition unit 120 can recognize contact by the user or the like, the surrounding temperature, presence of a moving object, the posture of the autonomous moving body 10, and the like.

Furthermore, the recognition unit 120 has the function of estimating and understanding the surrounding environment and circumstances in which the autonomous moving body 10 is on the basis of the recognized information described above. At this time, the recognition unit 120 may comprehensively perform circumstances estimation using environmental knowledge stored in advance.

(Learning Unit 130)

The learning unit 130 has a function of learning an environment (circumstances) and an action, and an effect on the environment by the action. The learning unit 130 realizes the learning described above using, for example, a machine learning algorithm such as deep learning. Note that the learning algorithm adopted by the learning unit 130 is not limited to the example described above and can be appropriately designed.

(Action Planning Unit 140)

The action planning unit 140 has the function of planning an action performed by the autonomous moving body 10 on the basis of the circumstances estimated by the recognition unit 120 and the knowledge learned by the learning unit 130. Details of the function of the action planning unit 140 will be separately described later.

(Operation Control Unit 150)

The operation control unit 150 has the function of controlling the operations of the drive unit 160 and the output unit 170 on the basis of the action plan by the action planning unit 140. The operation control unit 150 performs, for example, rotation control of the actuator 570, display control of the display 510, audio output control by a speaker, and the like on the basis of the action plan described above. Details of the function of the operation control unit 150 will be separately described in detail.

(Drive Unit 160)

The drive unit 160 has a function of bending and stretching a plurality of joint portions included in the autonomous moving body 10 on the basis of the control by the operation control unit 150. More specifically, the drive unit 160 drives the actuator 570 included in each joint portion on the basis of the control by the operation control unit 150.

(Output Unit 170)

The output unit 170 has the function of outputting visual information and audio information on the basis of the control by the operation control unit 150. For this purpose, the output unit 170 includes the display 510 and a speaker.

(Communication Unit 180)

The communication unit 180 has the function of performing information communication with the information processing server 20, the information processing terminal 30, and another autonomous moving body 10. For example, the communication unit 180 transmits information or the like related to the circumstances recognized by the recognition unit 120 to the information processing server 20. Furthermore, for example, the communication unit 180 receives a recommended action, control sequence data related to the recommended action, and data corresponding to a reward to be described later from the information processing server 20.

The functional configuration example of the autonomous moving body 10 according to an embodiment of the present disclosure has been described above. Note that the configuration described above with reference to FIG. 8 is merely an example, and the functional configuration of the autonomous moving body 10 according to an embodiment of the present disclosure is not limited to such an example. The functional configuration of the autonomous moving body 10 according to an embodiment of the present disclosure can be flexibly modified according to specifications and uses.

<<Functional Configuration Example of Information Processing Server 20>>

Figure 9:
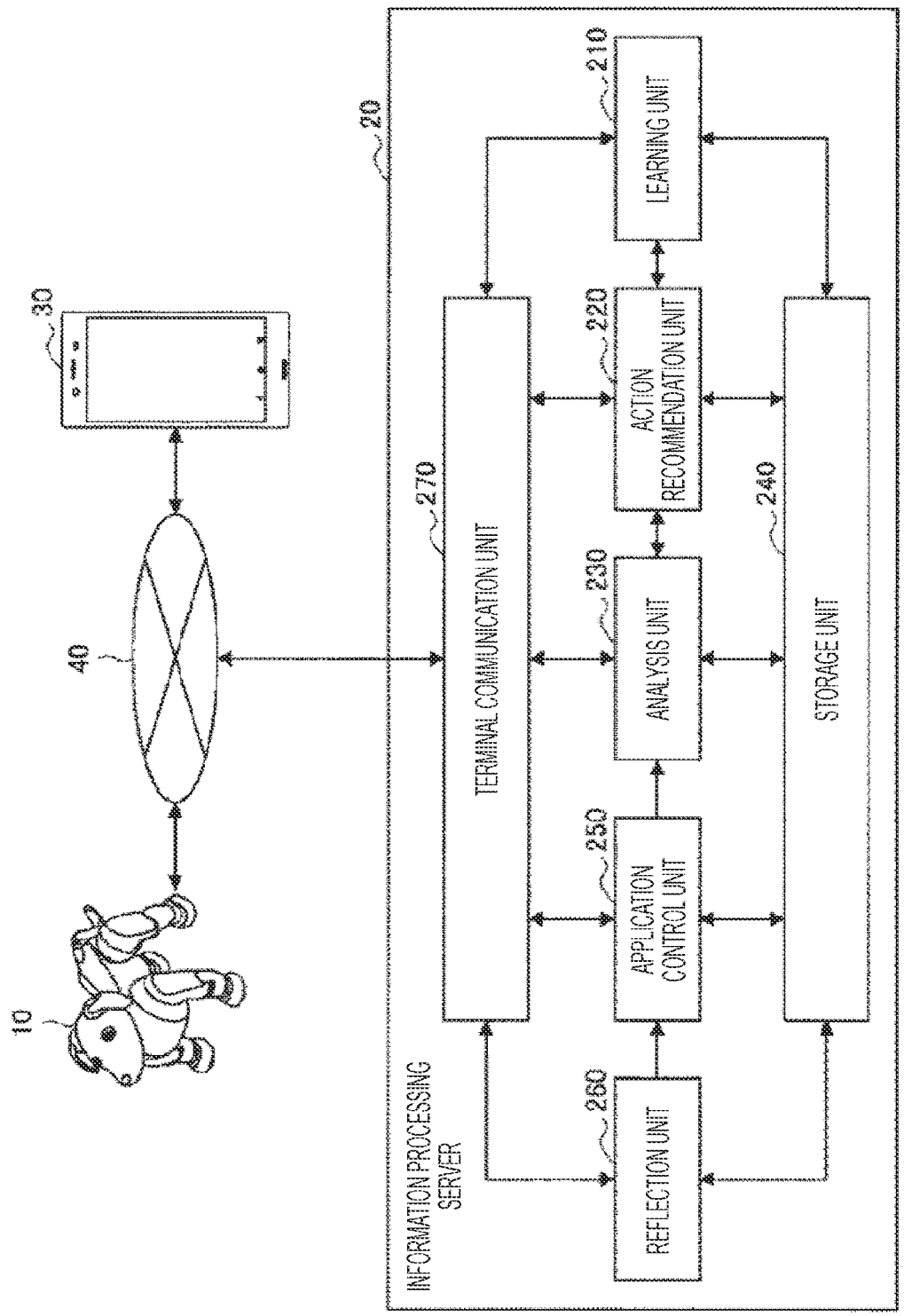
FIG. 9 is a diagram illustrating a functional configuration example of an information processing server according to an embodiment of the present disclosure.

Next, a functional configuration example of the information processing server 20 according to an embodiment of the present disclosure will be described. FIG. 9 is a diagram illustrating a functional configuration example of the information processing server 20 according to an embodiment of the present disclosure. Referring to FIG. 9, the information processing server 20 according to an embodiment of the present disclosure includes a learning unit 210, an action recommendation unit 220, an analysis unit 230, a storage unit 240, an application control unit 250, a reflection unit 260, and a terminal communication unit 270.

(Learning Unit 210)

The learning unit 130 has a function of learning an environment (circumstances) and an action, and an effect on the environment by the action. At this time, the learning unit 210 is characterized in performing learning based on an action history collected from a plurality of autonomous moving bodies 10. That is, the learning unit 210 can be referred to as collective intelligence common among the plurality of autonomous moving bodies 10.

(Action Recommendation Unit 220)

The action recommendation unit 220 has the function of determining a recommended action recommended to the autonomous moving body 10 on the basis of information related to circumstances estimation received from the autonomous moving body 10 and knowledge as collective intelligence possessed by the learning unit 210. Furthermore, one of the characteristics of the action recommendation unit 220 is to transmit, to the autonomous moving body 10 via the terminal communication unit 270, control sequence data for causing the autonomous moving body 10 to realize the recommended action together with the recommended action.

Here, the control sequence data described above is information including a control signal related to a time-series change in the rotational position of the joint portion included in the autonomous moving body 10, eyeball expression, and audio output. That is, the control sequence data can also be said to be setting data for causing the autonomous moving body 10 to realize an arbitrary operation (action).

According to the function of the action recommendation unit 220 described above, a new action that can be performed by the autonomous moving body 10 can be added as required, and it is possible to keep attracting the interest of the user in the autonomous moving body 10 continuously and the like.

(Analysis Unit 230)

The analysis unit 230 has the function of performing various analyses on the basis of the information received from the autonomous moving body 10. The analysis unit 230 can analyze the condition of the actuator 570 and the like on the basis of, for example, the action history and the operational circumstances received from the autonomous moving body 10. Furthermore, the analysis unit 230 can analyze the interest (degree of enthusiasm) or the like of the user in the autonomous moving body 10 on the basis of the information regarding contact, response, or the like of the user received from the autonomous moving body 10.

(Storage Unit 240)

The storage unit 240 has the function of accumulating information used by each component of the information processing server 20. The storage unit 240 stores, for example, the control sequence data received from the autonomous moving body 10 in association with the circumstances and the response of the user. Furthermore, the storage unit 240 stores information used for analysis by the analysis unit 230 and a result of the analysis. Furthermore, the storage unit 240 stores various types of data related to an application and a reward as described later.

(Application Control Unit 250)

The application control unit 250 controls an operation of an application related to communication between the autonomous moving body 10 and the user. For example, the application control unit 250 controls the operation and output expression of the avatar imitating the autonomous moving body 10 on the application. At this time, the application control unit 250 may perform output control reflecting the operational circumstances and feelings of the autonomous moving body 10. Details of the function of the application control unit 250 will be separately described later.

(Reflection Unit 260)

The reflection unit 260 has the function of reflecting the operation of the user on the application to the autonomous moving body 10. For example, the reflection unit 260 can reflect the reward acquired by the avatar on the basis of the operation of the user to the autonomous moving body 10. Details of the function of the reflection unit 260 will be separately described later.

(Terminal Communication Unit 270)

The terminal communication unit 270 has the function of performing information communication with a plurality of autonomous moving bodies 10 via the network 40. The terminal communication unit 270 receives, for example, information related to circumstances estimation from the autonomous moving body 10. Furthermore, the terminal communication unit 270 transmits, for example, information related to the recommended action determined by the action recommendation unit 220 and the control sequence data to the autonomous moving body 10.

Furthermore, the terminal communication unit 270 transmits, to the autonomous moving body 10, various types of control signals for reflecting the settings made by the user on the application and the reward acquired by the avatar to the autonomous moving body 10 on the basis of the control by the reflection unit 260.

The functional configuration example of the information processing server 20 according to an embodiment of the present disclosure has been described above. Note that the configuration described above with reference to FIG. 9 is merely an example, and the functional configuration of the information processing server 20 according to an embodiment of the present disclosure is not limited to such an example. For example, various functions of the information processing server 20 can be implemented by being distributed to a plurality of apparatuses. The functional configuration of the information processing server 20 according to an embodiment of the present disclosure can be flexibly modified according to specifications and uses.

<<Functional Configuration Example of Information Processing Terminal 30>>

Figure 10:
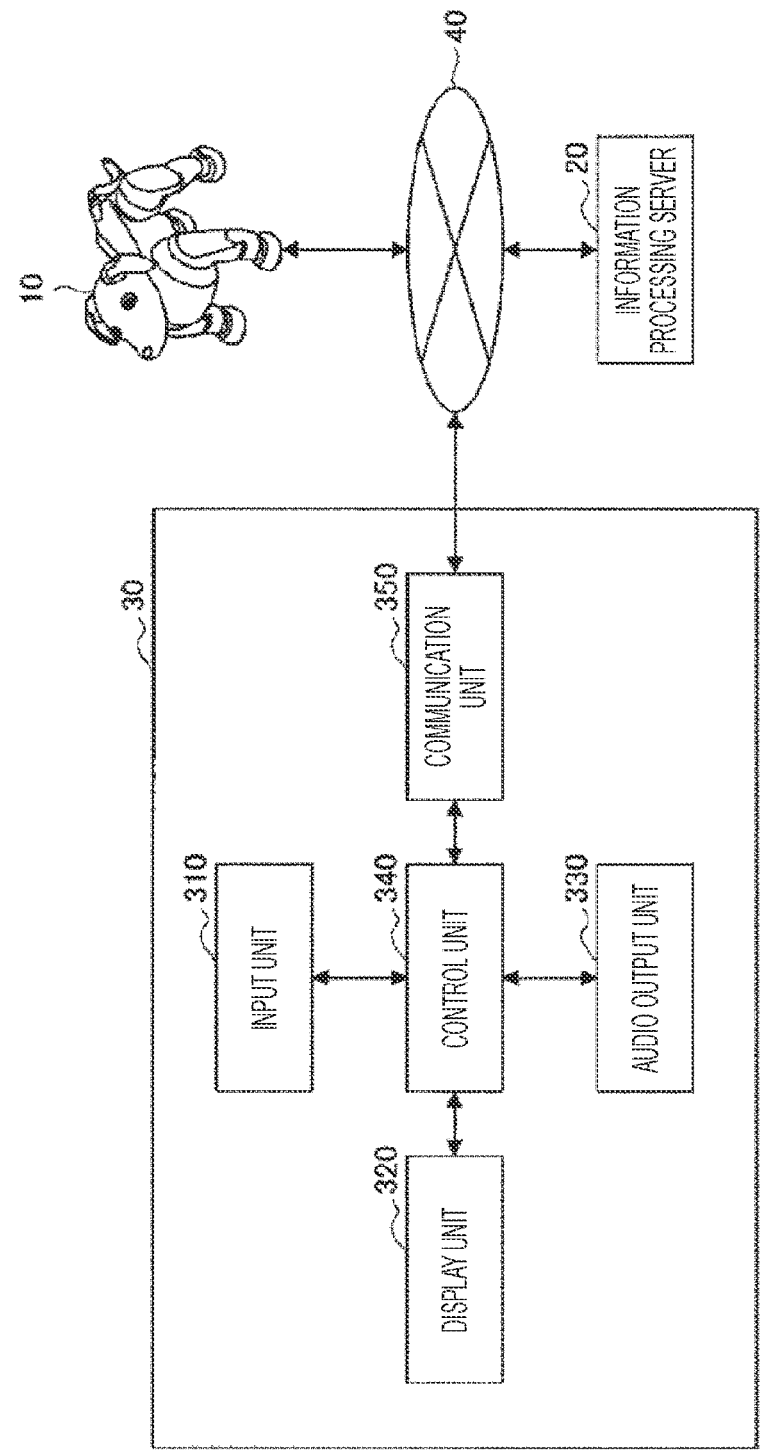
FIG. 10 is a diagram illustrating a functional configuration example of an information processing terminal according to an embodiment of the present disclosure.

Next, a functional configuration example of the information processing terminal 30 (information processing apparatus 30) according to an embodiment of the present disclosure will be described. FIG. 10 is a diagram illustrating a functional configuration example of the information processing terminal 30 according to an embodiment of the present disclosure. Referring to FIG. 10, the information processing terminal 30 includes an input unit 310, a display unit 320, an audio output unit 330, a control unit 340, and a communication unit 350.

(Input Unit 310)

The input unit 310 has the function of detecting an input operation by the user. For this purpose, the input unit 310 includes a keyboard, a touch panel, various buttons, and the like. Furthermore, the input unit 310 may include a microphone or the like that detects audio input by the user. Furthermore, the input unit 310 may include an imaging device that captures an image of the user or the like.

(Display Unit 320)

The display unit 320 has the function of presenting various types of visual information to the user. For example, the display unit 320 displays a user interface related to the above-described application on the basis of control by the information processing server 20. For this purpose, the display unit 320 includes various display devices.

(Audio Output Unit 330)

The audio output unit 330 has the function of outputting various types of sounds. For example, the audio output unit 330 outputs various types of sounds related to the above-described application on the basis of control by the information processing server 20. For this purpose, the audio output unit 330 includes a speaker, an amplifier, and the like. Note that, while it is described as audio in the drawings, as described in FIGS. 11 to 13, it also has an output function other than audio, and the name of the output unit can be appropriately used. In this case, the output unit, in FIGS. 11 to 13, includes an irradiation unit (projection unit) having an irradiation (projection) function such as a projector.

(Control Unit 340)

The control unit 340 generally controls each component included in the information processing terminal 30. For example, the control unit 340 may control start and stop of each component. Furthermore, the control unit 340 has the function of passing various control signals generated by the information processing server 20 to the display unit 320 and the audio output unit 330. Furthermore, the control unit 340 may have a function similar to that of the application control unit 250 or the reflection unit 260 of the information processing server 20.

(Communication Unit 350)

The communication unit 350 performs information communication with the information processing server 20 and the autonomous moving body 10 via the network 40. For example, the communication unit 350 receives a control signal related to an application and data related to a reward to be described later from the information processing server 20. Furthermore, for example, the communication unit 350 transmits information related to the operation of the user detected by the input unit 310 to the information processing server 20.

The functional configuration example of the information processing terminal 30 according to an embodiment of the present disclosure has been described above. Note that the functional configuration described above with reference to FIG. 10 is merely an example, and the functional configuration of the information processing terminal 30 according to an embodiment of the present disclosure is not limited to such an example. For example, as described above, the information processing terminal 30 may have a function similar to that of the application control unit 250 and the reflection unit 260 of the information processing server 20. The functional configuration of the information processing terminal 30 according to an embodiment of the present disclosure can be flexibly modified according to specifications and uses.

<<Another Mode of System Configuration Example>>

Figure 11:
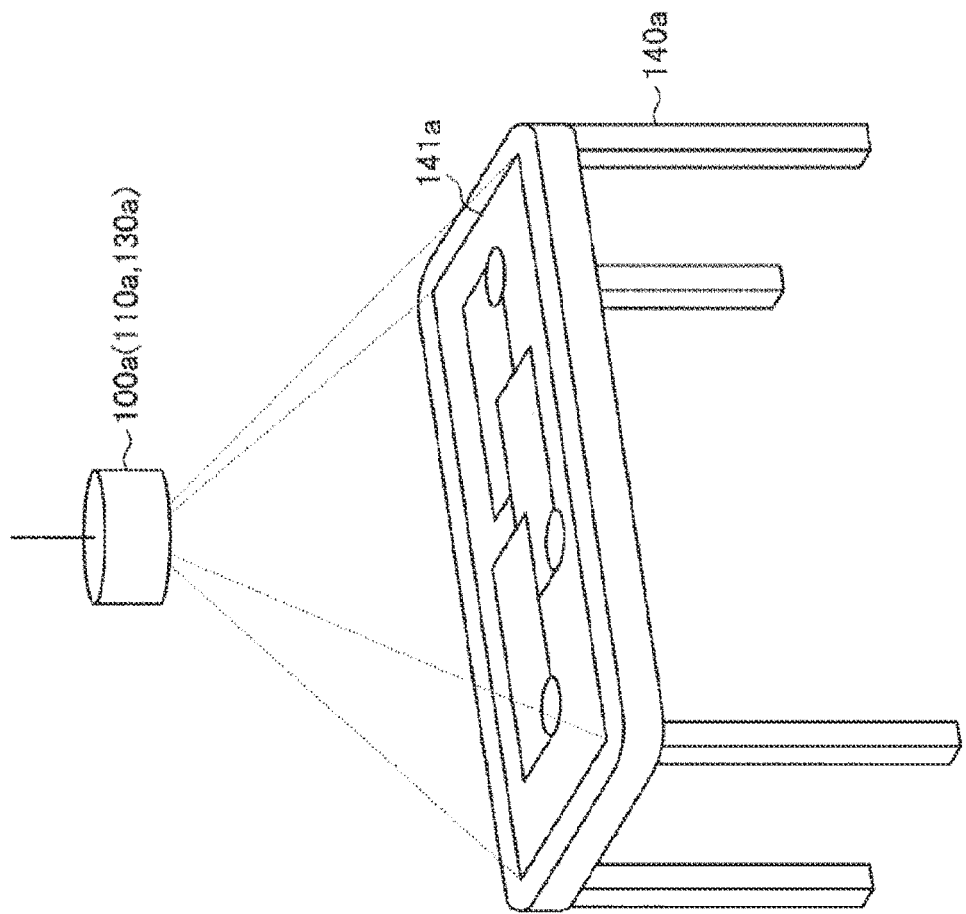
FIG. 11 is an explanatory diagram illustrating a configuration example of an information processing system according to an embodiment of the present disclosure.

First, another mode of a configuration example of a system according to an embodiment of the present disclosure will be described with reference to the drawings. FIG. 11 is an explanatory diagram illustrating a configuration example of an information processing system according to an embodiment of the present disclosure. Hereinafter, a configuration example of the information processing system according to an embodiment of the present disclosure will be described with reference to FIG. 11. Note that, in FIGS. 11 to 13, a projection apparatus will be used as an example of the information processing terminal 30.

As illustrated in FIG. 11, an information processing system according to an embodiment of the present disclosure includes a projection apparatus 100a as an information processing apparatus having an output function and an input function. In the example illustrated in FIG. 11, the projection apparatus 100a displays information on a top surface 141a (tabletop) of a table 140a and causes the user to operate the information displayed on the top surface 141a. A method of displaying information on the top surface 141a of the table 140a as illustrated in FIG. 11 is also referred to as "projection type".

The projection apparatus 100a is provided above the table 140a, for example, in a state of being suspended from the ceiling. That is, the projection apparatus 100a is provided isolatedly from the table 140a to be a target on which information is displayed.

Furthermore, the projection apparatus 100a includes an input function (input unit 110a) for inputting content of the user's operation on display information on the top surface 141a (tabletop), the shape of an object placed on the table 140a, and the like. As the input unit 110a of the projection apparatus 100a, for example, a camera that captures an image of the table 140a with one lens, a stereo camera that can capture an image of the table 140a with two lenses and record information in the depth direction, a microphone (hereinafter, referred to as a microphone) for collecting sound uttered by the user and surrounding environmental sound, or the like is used.

In a case where a camera that captures an image of the table 140a with one lens is used as the input unit 110a, the projection apparatus 100a can detect an object placed on the table 140a by analyzing the image captured by the camera. Furthermore, in a case where a stereo camera is used as the input unit 110a, for example, a visible light camera, an infrared camera, or the like can be used as the stereo camera. In a case where the stereo camera is used, the projection apparatus 100a can acquire depth information. By acquiring the depth information, the projection apparatus 100a can detect a hand or an object placed on the table 140a, for example, distinctively from the pattern of the top surface 141a or the pattern of the table cloth. Furthermore, by acquiring the depth information, the projection apparatus 100a can detect touch or approach of a hand of the user to the top surface 141a of the table 140a or detect separation of the hand from the top surface 141a. Note that, in the following description, a user touching or approaching an information display surface (here, the top surface 141a) with an operating body such as a hand is also collectively referred to simply as "touch".

Furthermore, in a case where a microphone is used as the input unit 110a, a microphone array for collecting sound in a specific direction can be used as the microphone. The projection apparatus 100a may adjust a sound collection direction of the microphone array to any direction.

Hereinafter, a case where an operation by the user is detected from an image captured by the input unit 110a will be mainly described, but the present disclosure is not limited to the related example. The operation by the user may be detected by a touch panel that is provided on the top surface 141a of the table 140a that detects the touch of a finger and the like of the user. Furthermore, the user operation that can be acquired by the input unit 110a may include, in addition, for example, a stylus operation on an information display surface, a gesture operation on a camera, and the like.

Furthermore, the projection apparatus 100a has an output function (output unit 130a) that displays information on the top surface 140a (tabletop) of the table 141a or outputs sound. As the output unit 130a, for example, a projector, a speaker, or the like is used.

In a case where the output unit 130a includes a projector, the output unit 130a projects information on the top surface 140a of the table 141a. In a case where the output unit 130a includes a speaker, the output unit 130a outputs sound on the basis of a sound signal. The number of speakers may be one or plural. In a case where the output unit 130a includes a plurality of speakers, the projection apparatus 100a can limit the speakers that output sound or adjust the direction in which sound is output.

Furthermore, in a case where the projection apparatus 100a is a projection type as illustrated in FIG. 11, the output unit 130a may include an illumination device. In a case where the illumination device is included, the projection apparatus 100a can control a state of turning on or off the illumination device and the like on the basis of the content of the information input by the input unit 110a.

The user who uses a projection system as illustrated in FIG. 11 can place his or her finger or the like on the top surface 141a to operate information displayed on the top surface 141a of the table 140a by an output function (output unit 130a) of the projection apparatus 100a.

Note that, although not illustrated in FIG. 11, another device may be connected to the projection apparatus 100a. For example, a mobile device such as a smartphone or a tablet terminal possessed by the user may be directly connected to the projection apparatus 100a by wireless connection, or may be connected to a server or the like via a network.

In the present disclosure, in a case where the autonomous moving body 10 moves on the table 140a, a figure indicating a state of feeling is irradiated (projected) on the tabletop in a projection manner according to the position and the state of feeling of the autonomous moving body 10. Note that a specific irradiation (projection) method will be described later.

Figure 12:
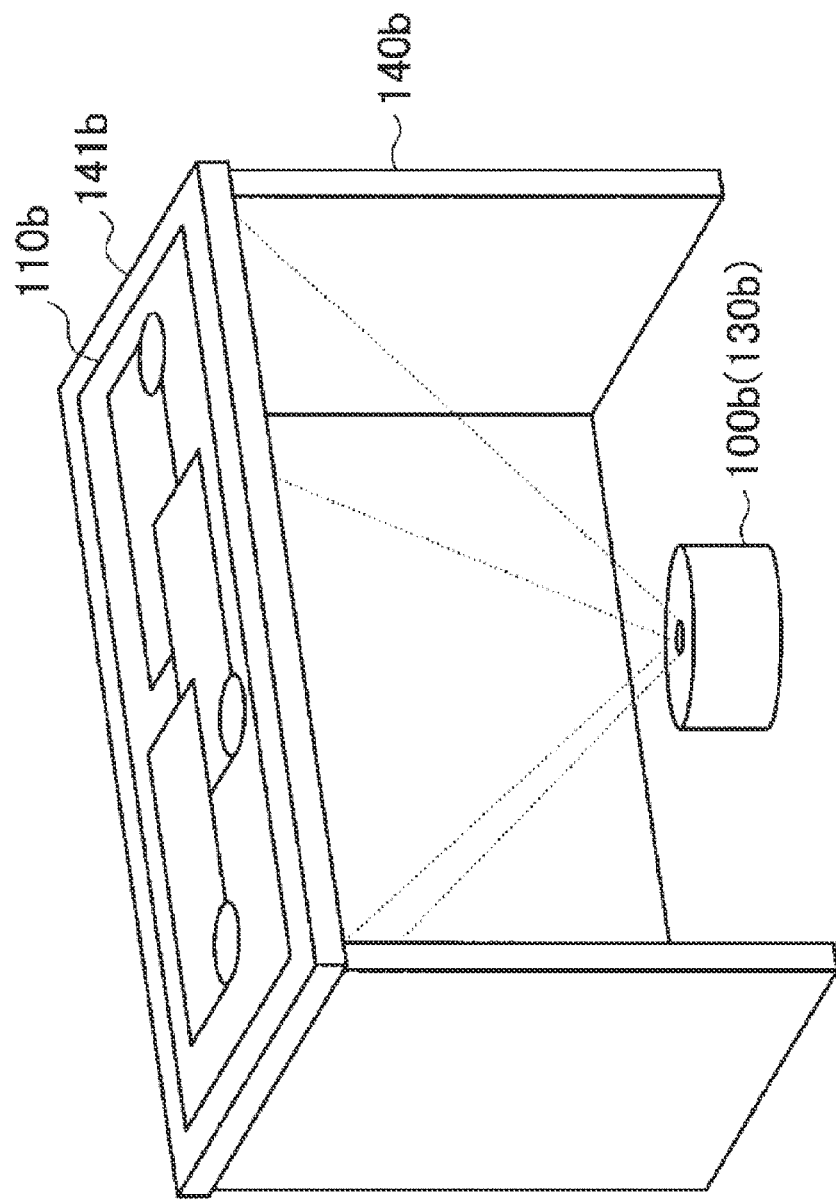
FIG. 12 is a diagram illustrating an example of another mode of the information processing system according to an embodiment of the present disclosure.
Figure 13:
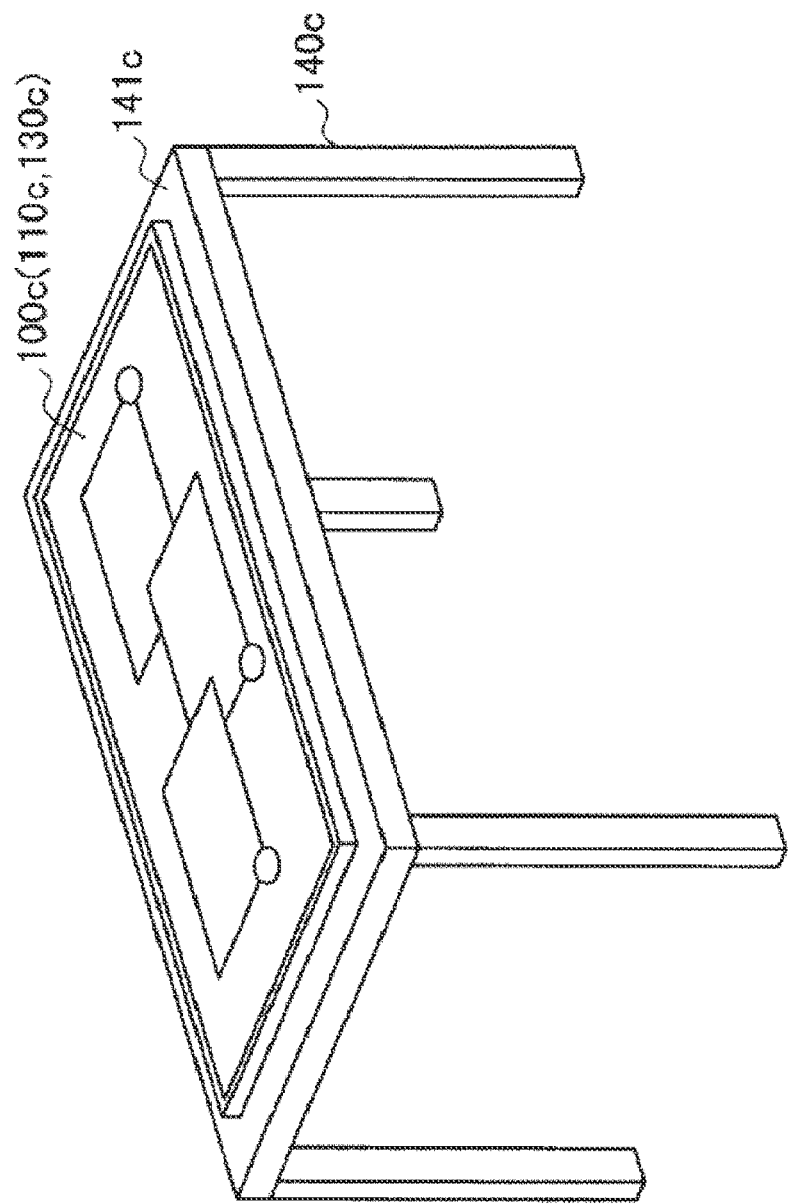
FIG. 13 is a diagram illustrating an example of another mode of the information processing system according to an embodiment of the present disclosure.

In the present disclosure, the mode of the information processing system is not limited to that illustrated in FIG. 11. FIGS. 12 to 13 are diagrams illustrating examples of another mode of the information processing system according to an embodiment of the present disclosure.

FIG. 12 is a diagram illustrating another configuration example of the information processing system according to an embodiment of the present disclosure, in which a projection apparatus 100b irradiates information from under a table 140b to display the information on a top surface 141b of the table 140b. In the example illustrated in FIG. 12, the projection apparatus 100b includes an output unit 130b realized by a projector. Furthermore, in the information processing system illustrated in FIG. 12, the top surface 141b of the table 140b serving as the information display surface is formed of a transparent material such as a glass plate or a transparent plastic plate. A method of displaying information on the top surface 141b by irradiating information from under the table 140b as illustrated in FIG. 12 is also referred to as "rear projection type". Furthermore, in the example illustrated in FIG. 12, an input unit 110b realized by a touch panel is provided on the top surface 141b of the table 140b and detects a user operation on the information displayed on the top surface 141b. Note that the input unit 110b is not limited to the configuration provided on the top surface 141b, and for example, the input unit 110b realized by a camera may be provided below the table 140b isolatedly from the table 140b, or may be included in the projection apparatus 100b.

In the present disclosure, in a case where the autonomous moving body 10 moves on the table 140b, a figure indicating the state of feeling is irradiated (projected) from under the table 140b in the rear projection type according to the position and the state of feeling of the autonomous moving body 10. Note that a specific irradiation (projection) method will be described later.

FIG. 13 is a diagram illustrating another configuration example of the information processing system according to an embodiment of the present disclosure. FIG. 13 illustrates a state in which an information processing apparatus 100c realized by a touch panel type display is placed on a top surface 141c of a table 140c. As described above, in a case where the touch panel type display is used, an input unit 110c and an output unit 130c can be configured as the touch panel type display. That is, in the information processing system illustrated in FIG. 13, the information display surface is the touch panel type display. As illustrated in FIG. 13, a method of displaying information on a touch panel type display placed on the top surface 141c is also referred to as "flat arrangement display type". In the information processing system illustrated in FIG. 13, a camera for detecting the position of the user may be provided above a touch panel type display.

In the present disclosure, in a case where the autonomous moving body 10 moves on the top surface 141c, a figure indicating the state of feeling is displayed on the touch panel display 130c according to the position and the state of feeling of the autonomous moving body 10. Note that a specific display method will be described later. Furthermore, the present disclosure is also applicable to a display that the output unit 130c does not have a touch panel function, and is not limited to the touch panel function.

<<Outline of Display/Irradiation (Projection) Example>>

Hereinafter, application examples according to the present embodiment will be described in detail with specific examples.

Figure 14:
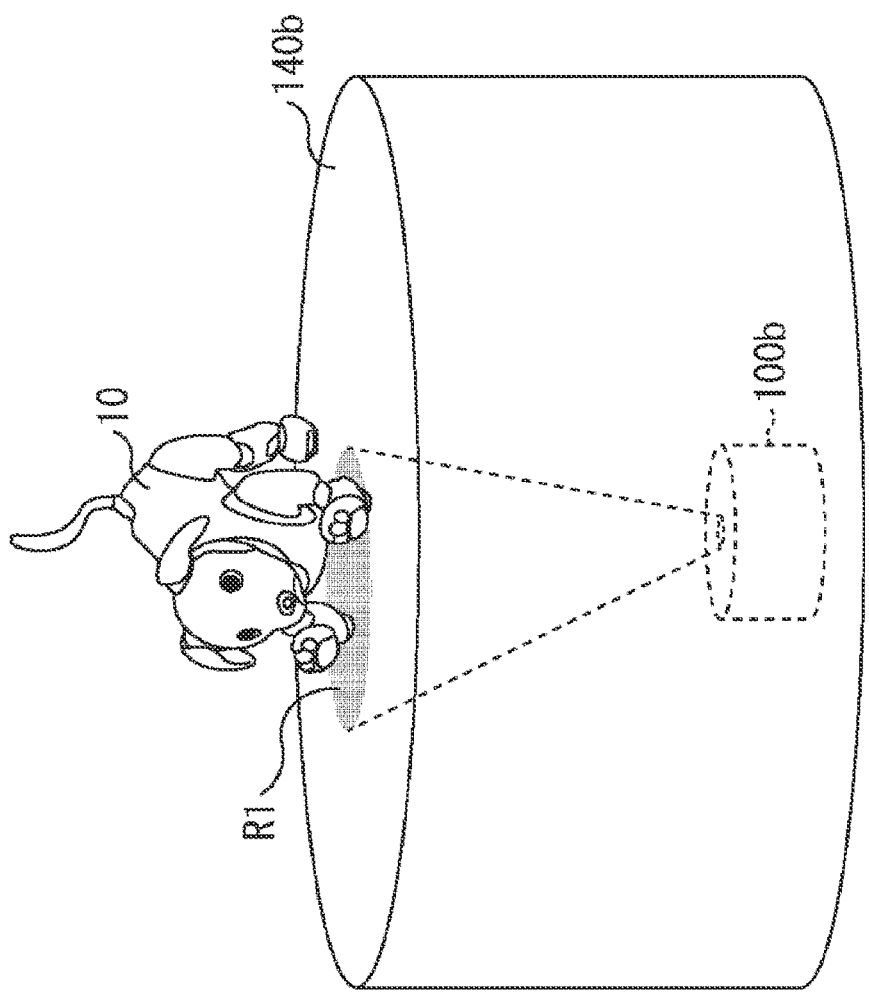
FIG. 14 is a diagram illustrating an example in which the autonomous moving body moves on a table.

FIG. 14 is an explanatory diagram illustrating an example in which the autonomous moving body 10 moves on the table 140b as illustrated in FIG. 12. In FIG. 14, in conjunction with the position of the autonomous moving body 10 and the state of feeling of the autonomous moving body 10, the projection apparatus 100b including the output unit 130b realized by the projector irradiates (projects) a state as a figure R1 to the lower side of the autonomous moving body 10. In this case, the position of the autonomous moving body 10 is sensed by a sensor (that is built in the projection apparatus 100b or is provided separately), and the projection apparatus 100b acquires a parameter (feeling parameter) indicating a feeling of the autonomous moving body 10 via the network. Then, the projection apparatus 100b performs irradiation (projection) such that the center (or the center of gravity) of the figure R1 is located in the vicinity of the center (or the center of gravity) of the autonomous moving body 10 according to the sensed position and the acquired feeling parameter. Therefore, the figure R1 moves according to the change in the position of the autonomous moving body 10, and the display form (characteristics, i.e., shape, size, color, and the like) changes in conjunction with the change in the feeling of the autonomous moving body 10. Note that the rear projection type has an advantage that a shadow of the autonomous moving body 10 is not displayed along with the irradiation (projection) as compared with the projection type.

Figure 15:
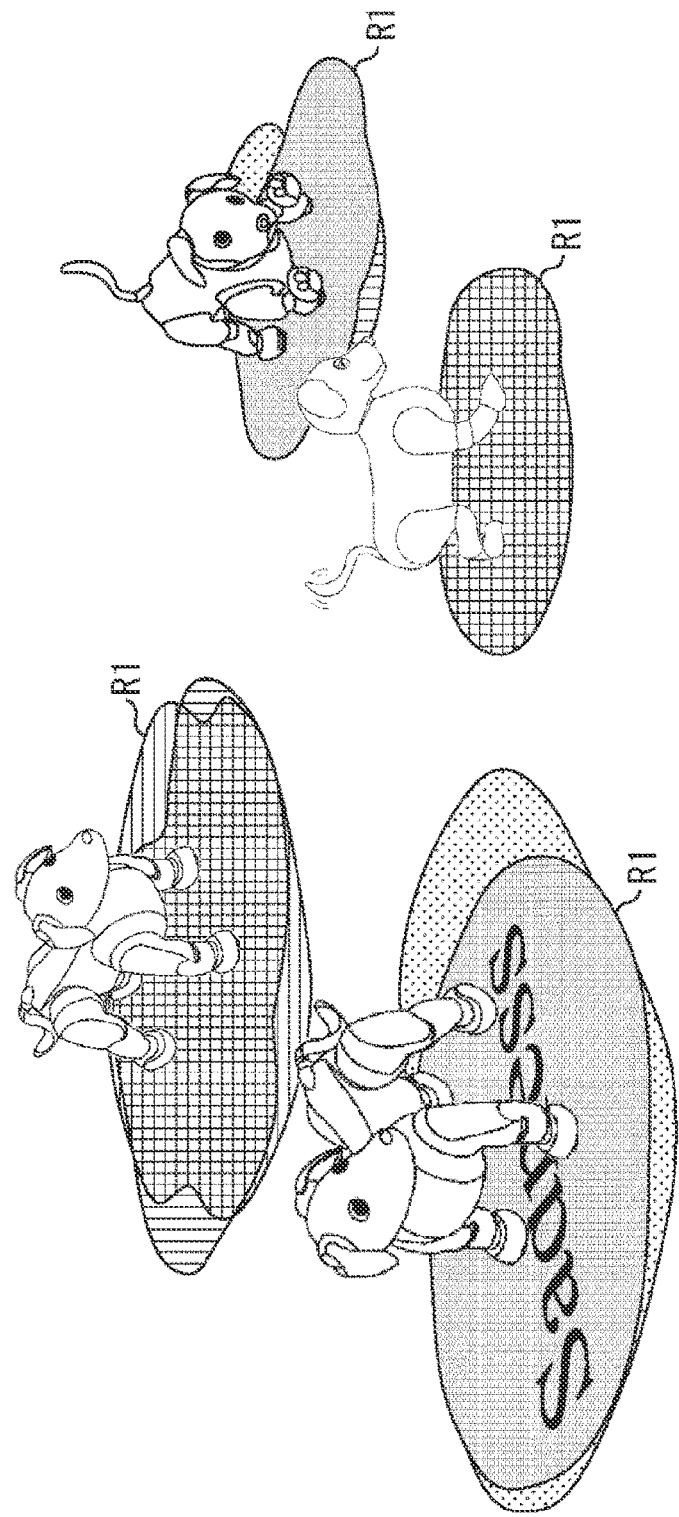
FIG. 15 is a diagram illustrating another example in which the autonomous moving body moves.

FIG. 15 is a diagram illustrating another example in which the autonomous moving body 10 moves. In FIG. 15, the state of the figure R1 to be irradiated or displayed is different according to the state of feeling of the autonomous moving body 10. For example, in a case where the autonomous moving body 10 has a sad feeling, blue is colored in a state where the circle is deformed. Note that not only the figure R1 but also the name of the feeling (sadness) may be irradiated (projected) or displayed so as to be superimposed on the figure R1.

Figure 16:
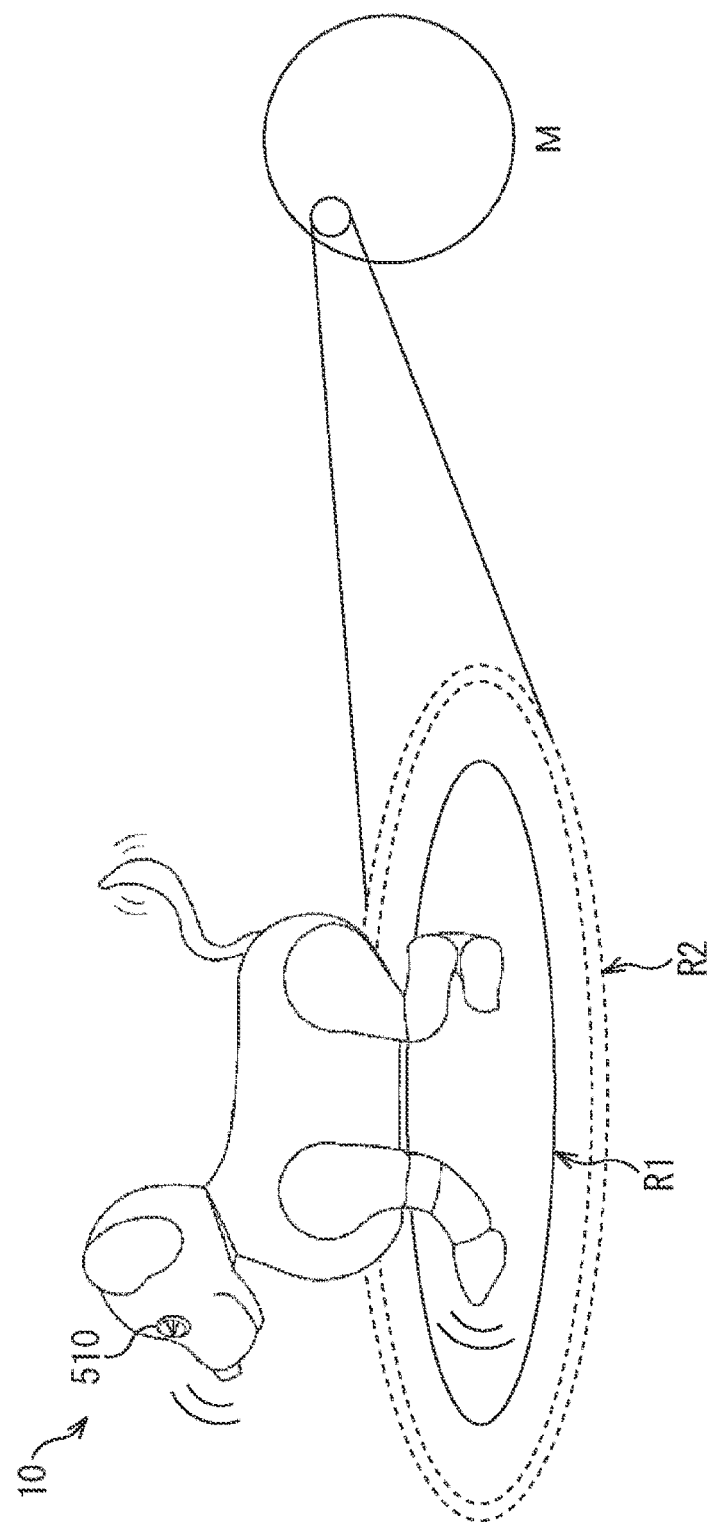
FIG. 16 is a diagram illustrating another example in which the autonomous moving body moves.

FIG. 16 is a diagram illustrating another example in which the autonomous moving body 10 moves. FIG. 16 illustrates a state in which another autonomous moving body M that supports the autonomous moving body 10 follows the autonomous moving body 10 while sensing the condition (motion, movement, and the like) of the autonomous moving body 10. In this case, another autonomous moving body M acquires position information by sensing the position of the autonomous moving body 10 with a sensor and acquires a parameter (feeling parameter) indicating a feeling of the autonomous moving body 10 via the network, thereby irradiating (projecting) a figure R1 and a figure R2 such that the center (or the center of gravity) of the figure is located in the vicinity of the center (or the center of gravity) of the autonomous moving body 10 in conjunction with the position of the autonomous moving body 10 and the state of feeling of the autonomous moving body 10. Note that the figure R2 is a figure (guide) indicating a reference of the shape of the figure. By irradiating (projecting) the figure R2, a change in the display form of the figure R1 can be easily visually recognized. Note that it is sufficient to irradiate the figure R2 as necessary. Note that the configuration of the other autonomous moving body M is similar to that of the information processing terminal 30 described in FIG. 10.

Figure 17:
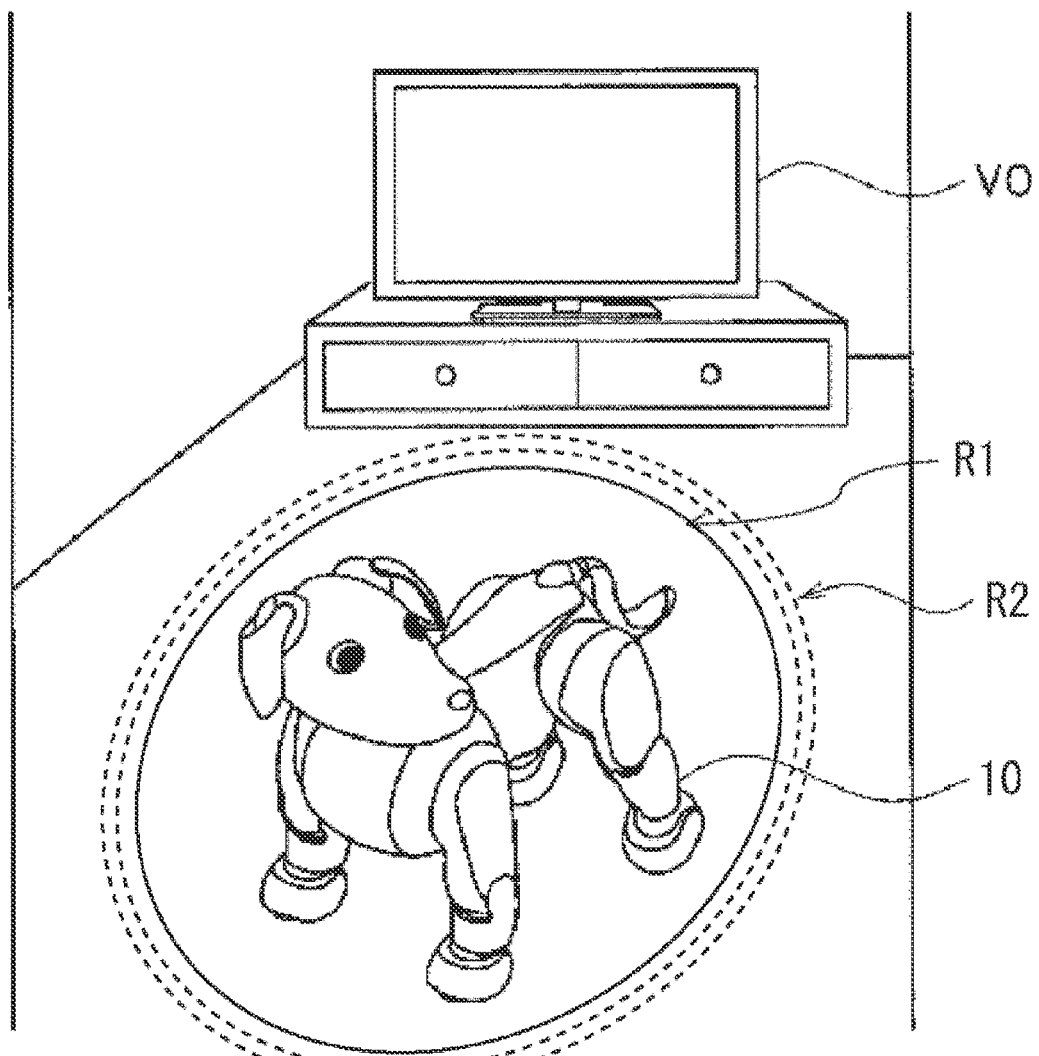
FIG. 17 is a diagram illustrating a state in which the information processing terminal uses augmented reality.

FIG. 17 illustrates a state in which the information processing terminal 30 uses augmented reality in which information is superimposed while capturing an image of the real world using a mounted camera in a living room having a television VO. In FIG. 17, in a case where imaging the autonomous moving body 10, the information processing terminal 30 acquires the feeling parameter of the autonomous moving body 10 via the network, acquires the position (or distance) of the autonomous moving body 10 using a mounted sensor (depth sensing, TOF sensing, infrared sensing, and the like using a camera), and displays the figure R1 and the figure R2 on the display screen displayed at the time of imaging such that the center (or the center of gravity) of the figure is located in the vicinity of the center (or the center of gravity) of the autonomous moving body 10 in conjunction with the position of the autonomous moving body 10 and the state of feeling of the autonomous moving body 10. As described above, the present disclosure can be used as a display form of augmented reality.

Figure 18:
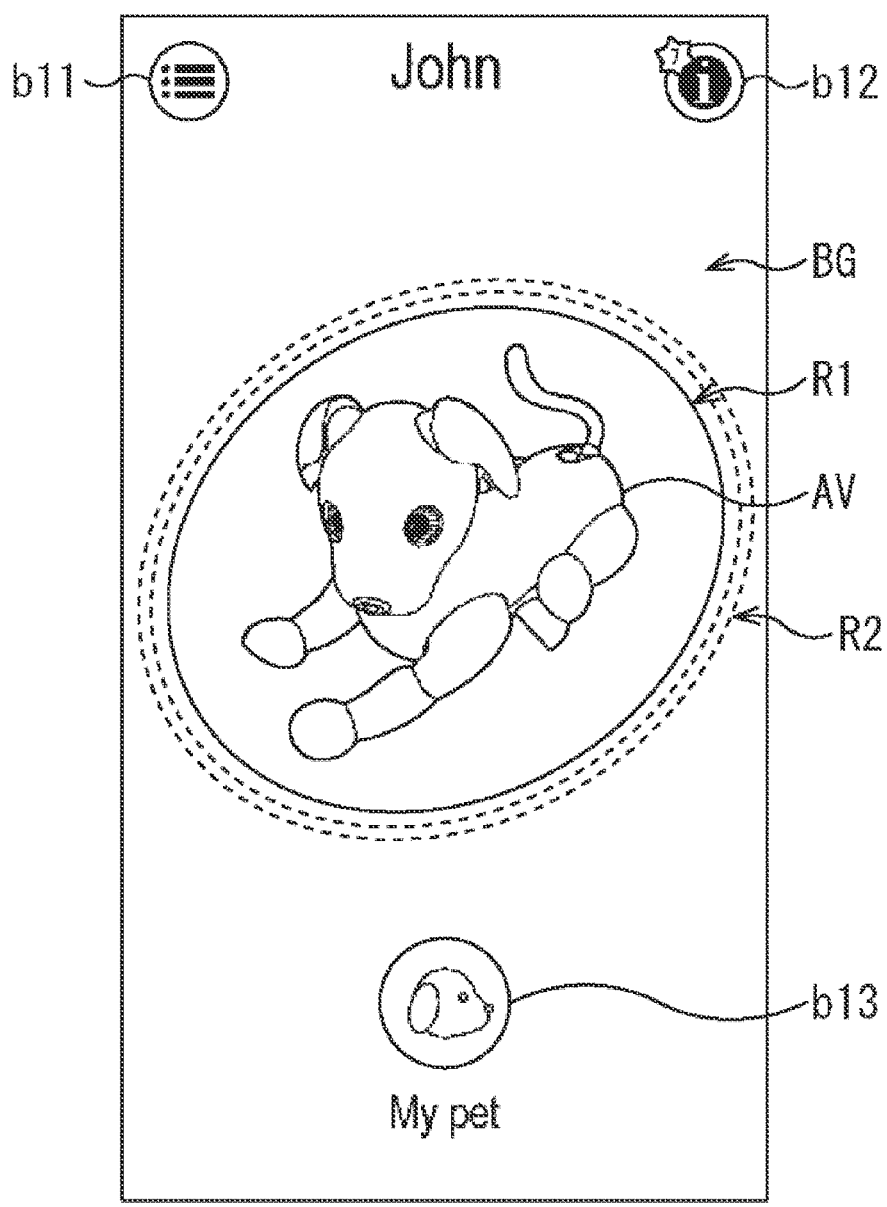
FIG. 18 is an example of displaying a three-dimensional (3D) model of the autonomous moving body as an avatar on a display screen.

FIG. 18 is an example in which a 3D model imitating an exterior, sound (cry), or the like of the autonomous moving body 10 possessed by the user is displayed as an avatar AV on the display described in FIG. 13 or the display screen of the information processing terminal 30. Here, the exterior described above includes, for example, colors such as an eyeball (pupil, iris, and the like), a body-color, and the like of the autonomous moving body 10. Similarly to the example of the augmented reality of FIG. 17, in a case where using the application in which the avatar AV is displayed, the information processing terminal 30 acquires the feeling parameter of the autonomous moving body 10 via the network, acquires the position (or distance) of the autonomous moving body 10 using the mounted sensor (depth sensing, TOF sensing, infrared sensing, and the like using a camera), and displays the figure R1 and the figure R2 on the display screen of the application such that the center (or the center of gravity) of the figure is located in the vicinity of the center (or the center of gravity) of the autonomous moving body 10 in conjunction with the position of the autonomous moving body 10 and the state of feeling of the autonomous moving body 10. As described above, the present disclosure can be applied to various applications related to the autonomous moving body 10.

<<Specific Example of Display/Irradiation (Projection) Example>>

First, a concept of the present disclosure will be described. The present disclosure focuses on presenting feeling to the user more intuitively and with high responsivity in a case where the feeling changes temporally, such as an interaction with the user and a motion (stroking the head, or the like) performed on the autonomous moving body 10 by the user, instead of presenting the feeling by an expression, an interaction, a motion, or the like when feeding back the feeling to the user (person) considering the autonomous moving body 10 whose motion changes with feeling as a target. Conventionally, the user has been got to associate feeling through an expression of a face imitating a person or an animal, a voice or a cry, or a motion of the autonomous moving body 10 itself. Furthermore, the feeling has merely been quantified, a name and number of the feeling have merely been presented in text, graph, or the like. The present disclosure is characterized in that a state of feeling is presented to a user in a display form in which the feeling can be more intuitively understood.

In the present disclosure, in consideration of the relationship between the change in the position and the change in the feeling accompanying the movement of the autonomous moving body 10, the change in the feeling is expressed by the change in the state of the figure that is likely to be associated by a person (change in shape, speed of change in shape, change in size, peed of change in size, change in color, speed of change in color, change in the combination of colors, speed of change in the combination of colors, change in gradation, speed of change in gradation, and the like) while causing to follow the change in the position. With such expression, the user who confirms the autonomous moving body 10 can intuitively associate the state of feeling of the autonomous moving body 10 by making association as required and can easily grasp the state of the feeling.

Figure 19:
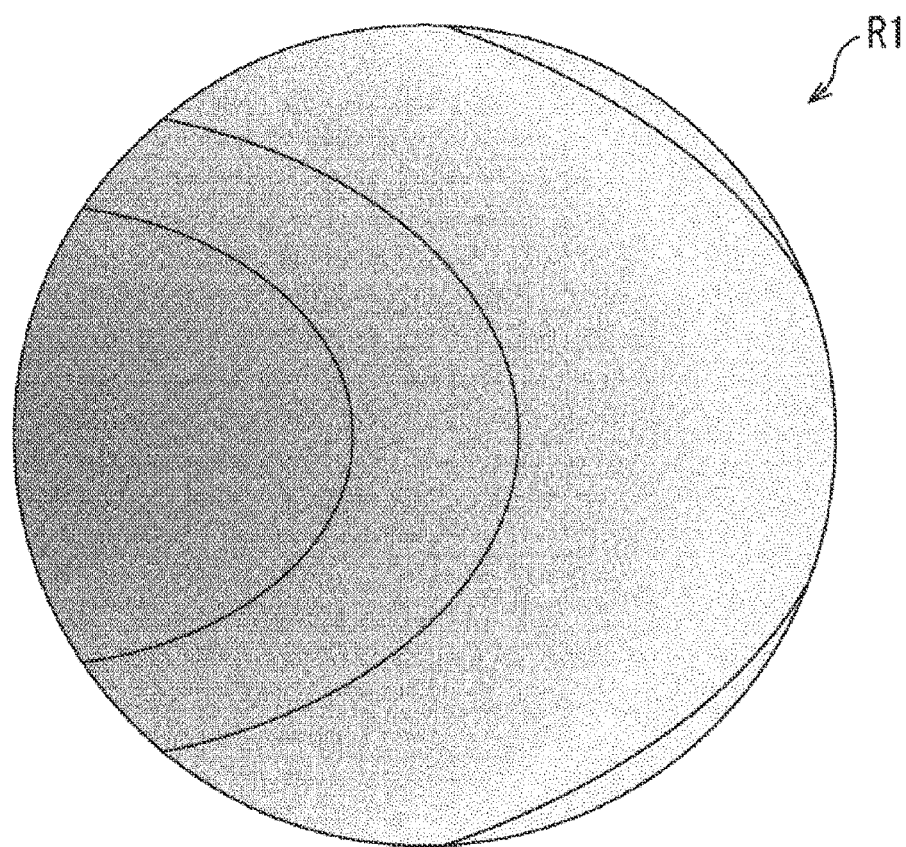
FIG. 19 is a diagram illustrating an appearance of a figure R1 to be irradiated (projected) or displayed.

FIG. 19 illustrates an appearance of the figure R1 to be irradiated (projected) or displayed as described above. The display form (shape, size, color, gradation, and the like) of the figure R1 changes according to the position of the autonomous moving body 10 and the feeling condition (the content of the feeling parameter) of the autonomous moving body 10. In the present embodiment, an example in which a display form is changed based on a circle (suggestive of life, stability, and the like) will be described. In FIG. 19, feeling and color (gradation) are associated, and a line inside a circle indicates a change point of color (the line itself is not displayed because of gradation originally). For example, from the left, the color inside the circle changes from green, yellow, and light blue. As described above, in a case where displaying a plurality of feelings, the feeling condition of the autonomous moving body 10 is displayed by color gradation or the like. Note that it is also possible to display one feeling by a single color. Note that a specific relationship between a feeling and a display form will be described later.

Figure 20:
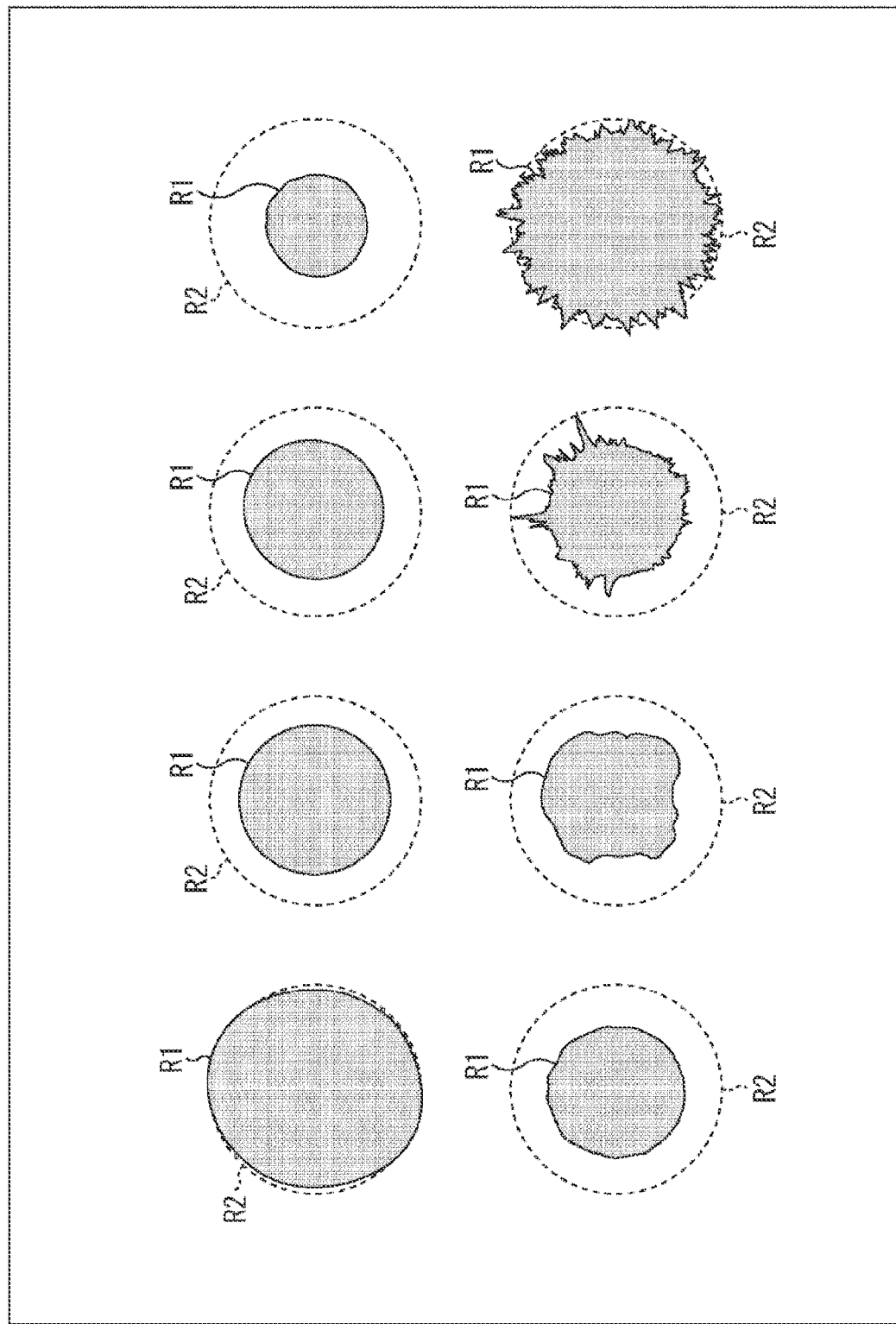
FIG. 20 is a diagram illustrating an example of a case where the shape and size of the figure R1 change.

FIG. 20 illustrates an example of a case where the shape and size of the figure R1 change as a change in the display form. The size of the figure R1 changes depending on the strength of the feeling (the magnitude of the feeling parameter value indicating the feeling). For example, in a case where the figure R1 is a figure of the same shape (the same feeling), the size of the figure R1 increases as the feeling becomes stronger. Similarly, in a case where the figure R1 is a figure of the same shape (the same feeling), the size of the figure R1 decreases as the feeling becomes weaker. As described with reference to FIG. 16, the figure R2 is a figure (guide) indicating a reference of the shape of the figure. By displaying this figure R2, a change in the shape of the figure R1 can be easily visually recognized. Note that it is sufficient to display the figure R2 as necessary.

Figure 21:
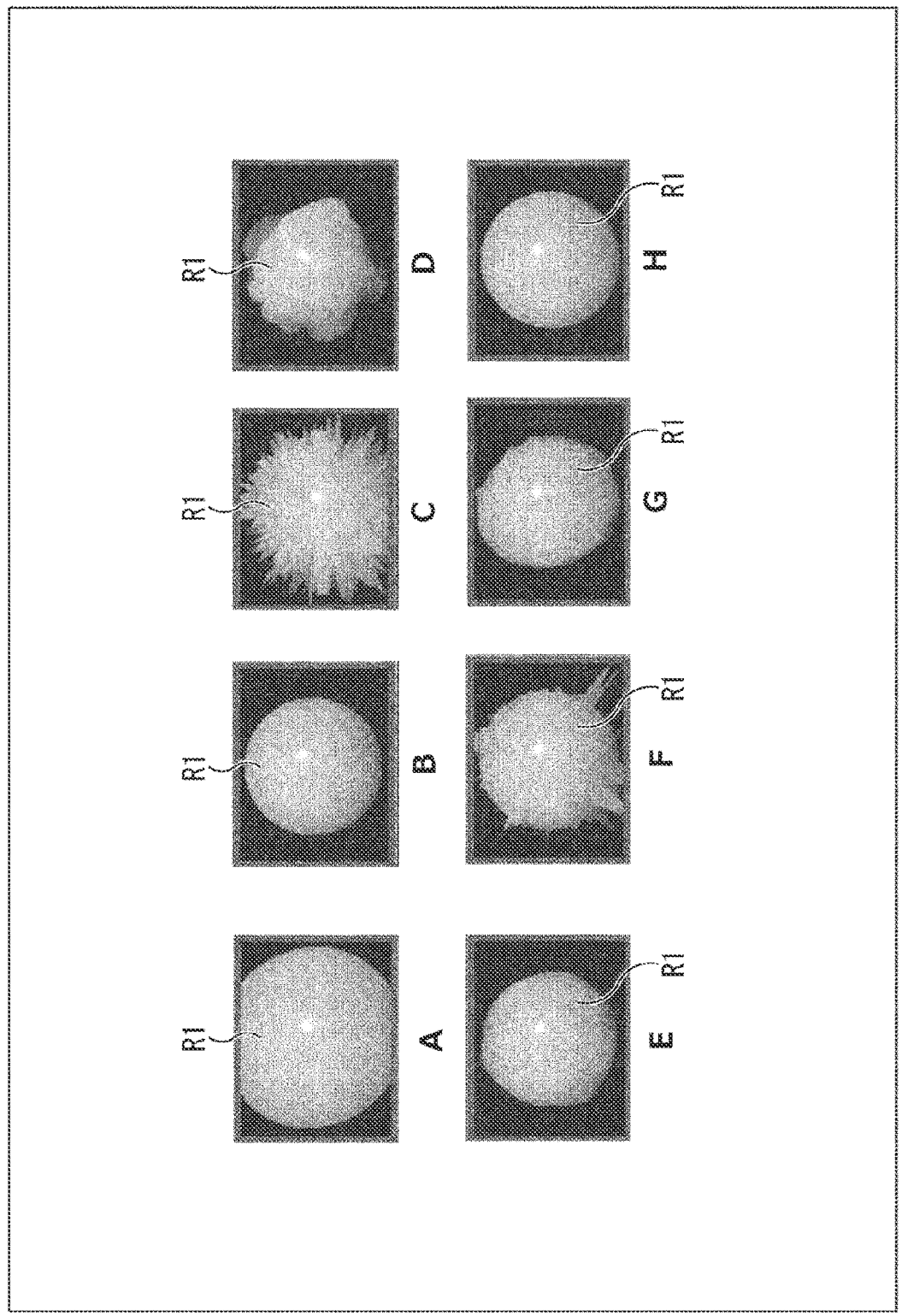
FIG. 21 is a diagram illustrating an example of a case where the shape of the figure R1 changes.

FIG. 21 illustrates an example of a case where the shape of the figure R1 changes as a change in the display form.

Graphic A of FIG. 21 illustrates a form associated with joy. Graphic B of FIG. 21 illustrates a form associated with anticipation. Graphic C of FIG. 21 illustrates a form associated with anger. Graphic D of FIG. 21 illustrates a form associated with disgust. Graphic E of FIG. 21 illustrates a form associated with sadness. Graphic F of FIG. 21 illustrates a form associated with surprise. Graphic G of FIG. 21 illustrates a form associated with fear. Graphic H of FIG. 21 illustrates a form associated with trust. As described above, the shape of the figure R1 changes depending on the content of the feeling (the content of the feeling parameter indicating the feeling). Note that, In FIG. 21, black on the outer periphery of the figure R1 is illustrated to facilitate understanding of the shape of the figure R1.

FIG. 22 illustrates a correspondence relationship between the feeling parameter that is the content (type) of the feeling of the autonomous moving body 10 and the display form of the figure R1. For example, the joy of the feeling parameter A corresponds to the figure R1 that has a stable circle (circle) shape colored in yellow and repeats enlargement and reduction with a rhythm suggestive of anticipation. Furthermore, the surprise of the feeling parameter F corresponds to the figure R1 that has a shape that looks like a balloon colored in light blue is popped and is temporarily fixed without changing the size so as to be suggestive of surprise.

FIG. 23 illustrates a correspondence relation between the feeling parameter that is the content (type) of the feeling of the autonomous moving body 10 and the display form of the figure R1. In FIG. 23, compared to FIG. 22, a pair of feelings in which two feelings (feeling parameters) pair up is added. The pair of feelings is a generic term for grouping two feeling parameters that are less likely to be compatible (likely to be a place to play a game) into a pair. In this case, it is assumed that just either one of the feeling parameters having a high possibility of being in the game in the pair of feelings only becomes active (has a large value). Therefore, in a case where the display form of the figure R1 is changed using a plurality of feeling parameters, colors and shapes corresponding to the number of pairs of feelings are used.

Figure 24:
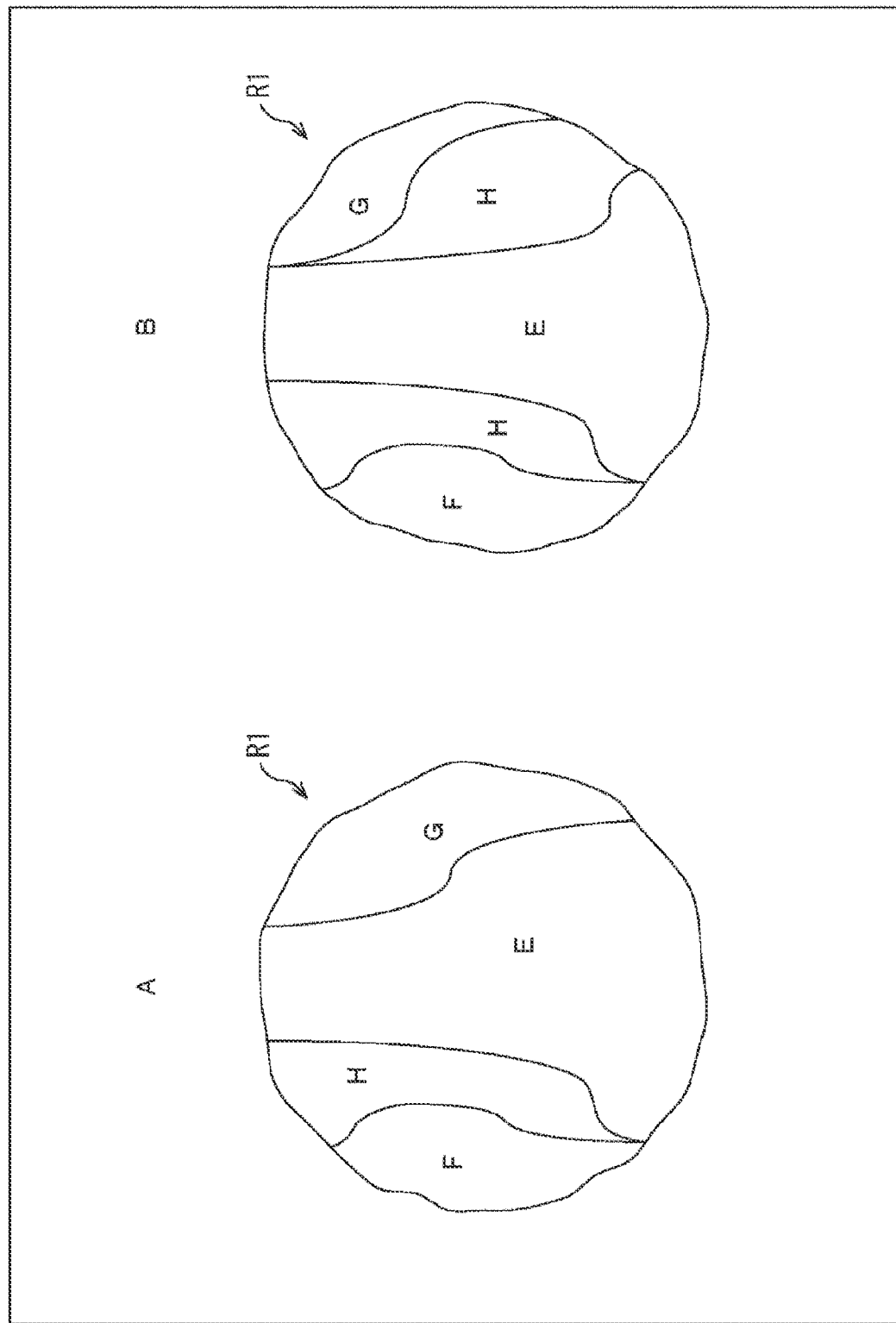
FIG. 24 is a diagram illustrating an example of changing the display form of the figure R1 using a pair of feelings and a plurality of feeling parameters.

FIG. 24 illustrates an example of changing the display form of the figure R1 using the pair of feelings and the plurality of feeling parameters in FIG. 23. For example, in a case where the feeling parameter E is active (or the value of the parameter is large) for the pair of feelings AE, the feeling parameter F is active (or the value of the parameter is large) for the pair of feelings BF, the feeling parameter G is active (or the value of the parameter is large) for the pair of feelings CG, and the feeling parameter H is active (or the value of the parameter is large) for the pair of feelings DH, the blue color associated with the feeling parameter E, the light blue color associated with the feeling parameter F, the green color associated with the feeling parameter G, and the lime green color associated with the feeling parameter H are displayed as the color of the figure R1. In this case, the region as illustrated is centered and colored using gradation. Note that, in FIG. 24, coloring and gradation of colors are omitted due to limitations of the drawings.

Furthermore, there may be a plurality of regions associated with active feelings, such as lime green associated with the feeling parameter H in Graphic B of FIG. 24. According to the magnitude of the value of the feeling parameter, the area of the associated color is displayed large. In this case, the ratio of the values of a plurality of feeling parameters may be displayed in association with the area of the color. Moreover, the shape corresponding to the feeling parameter having the maximum value among the active feeling parameters is displayed as the shape of the figure R1. As a result, it is possible to intuitively present which feeling is dominant among a plurality of feelings held by the autonomous moving body 10. In this manner, the display form of the figure R1 can be changed according to the type of the feeling parameter and the value of the feeling parameter.

Figure 25:
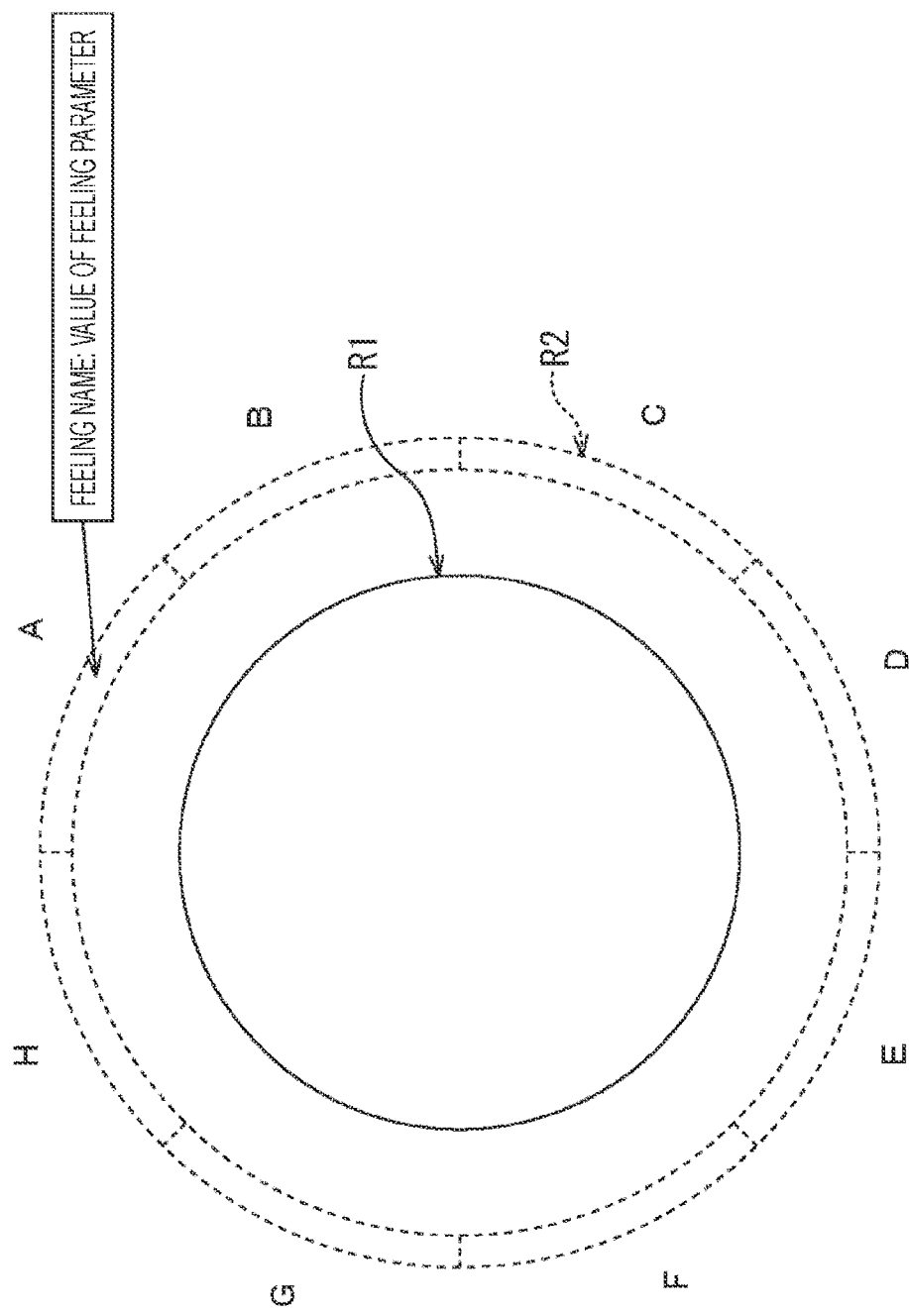
FIG. 25 is a diagram illustrating a display example of the figure R1 and a figure R2.

FIG. 25 is a diagram illustrating a display example of the figure R1 and the figure R2. The figure R1 is as described in FIGS. 14 to 24. As described with reference to FIGS. 16 and 20, the figure R2 is a figure (guide) indicating a reference of the shape of the figure. By displaying this figure R2, a change in the shape of the figure R1 can be easily visually recognized. In this example, in the figure R2, the feeling parameters included in the pair of feelings described in FIG. 24 are arranged in a place to play a game to each other, and for example, a name indicating the content (type) of the feeling parameter and a value of the feeling parameter are displayed in a part surrounded by a dotted line. As a result, the feelings in a place to play a game are not only playing game regarding the display position but also being able to be associated with the name and the specific number, so that the state of feeling of the autonomous moving body 10 can be more intuitively presented. Note that a display form in which the figure R2 is rotated so that the feeling name and the size can be confirmed from various angles and a display form in which the figure R2 is rotated so that the display corresponding to the feeling parameter having the maximum value is in front of the user observing the autonomous moving body 10 are also conceivable.

Figure 26:
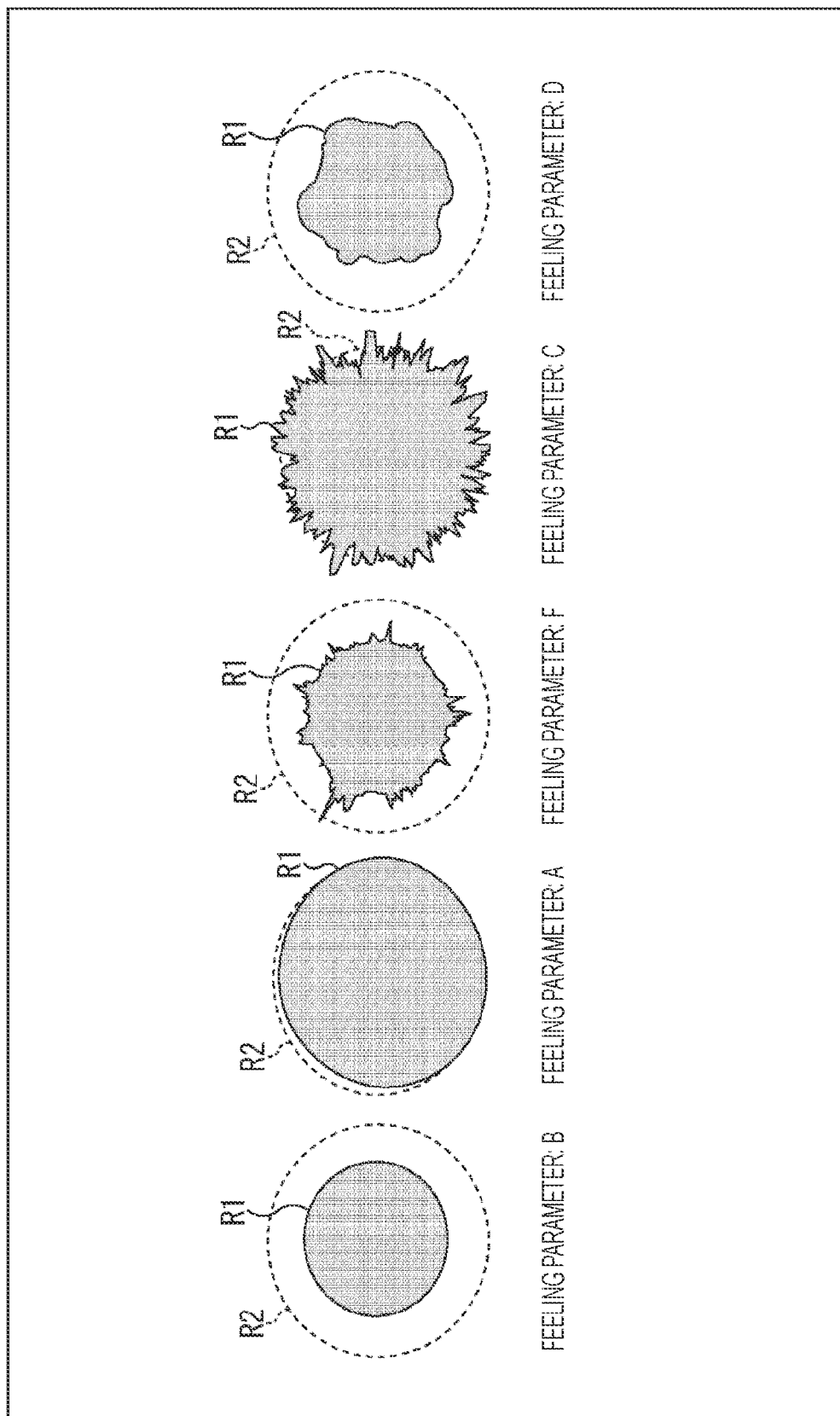
FIG. 26 is a diagram illustrating an example in which the display form of the figure R1 changes according to a temporal change in the content of the feeling parameter.

FIG. 26 is a diagram illustrating an example in which the display form of the figure R1 changes according to a temporal change in the content (type, value, and the like) of the feeling parameter. FIG. 26 illustrates how the display form of the figure R1 changes in the order of the feeling parameter: B, the feeling parameter: A, the feeling parameter: F, the feeling parameter: C, and the feeling parameter: D. That is, the figure R1 changes as the feeling parameter changes in the order of anticipation, great joy, surprise, great anger, and disgust. In addition to changing the display form of the figure R1 according to an interval at which the content (type, value, and the like) of the feeling parameter temporally changes, the display form of the figure R1 may be changed with the temporally equal interval as the stable interval.

<<Configuration Example of Information Processing Apparatus>>

Here, a configuration in which the information processing terminal 30 realizes the above-described display example will be described with reference to FIG. 10. The information processing terminal 30 specifies a position (an absolute position in the space, a relative position in the space, a distance to the autonomous moving body 10, and the like) of the autonomous moving body 10 by a sensor unit included in the input unit 310 by sensing the autonomous moving body 10. Note that the sensor unit may be in a form of being built in the information processing terminal 30 as the input unit 310 or in a form of acquiring information used to specify the position of the autonomous moving body 10 from a sensor unit (not illustrated in the drawings) provided outside. The communication unit 350 acquires the feeling parameter stored in the autonomous moving body 10 (or the feeling parameter stored in the information processing server 20) via the network. As described with reference to FIGS. 14 to 26, the control unit 340 performs control to change the display state (shape, size, color, color combination, movement, and the like) of the figure R1 (the figure R2 as required) to be irradiated (projected) or the figure R1 (the figure R2 as required) to be displayed on the display screen according to the position acquired by the sensor and the content (type, value, and the like) of the feeling parameter acquired by the communication unit 350. Note that, whether to display the figure R2 may be set by a user or the like.

<<Processing Procedure Example of Information Processing Apparatus>>

Figure 27:
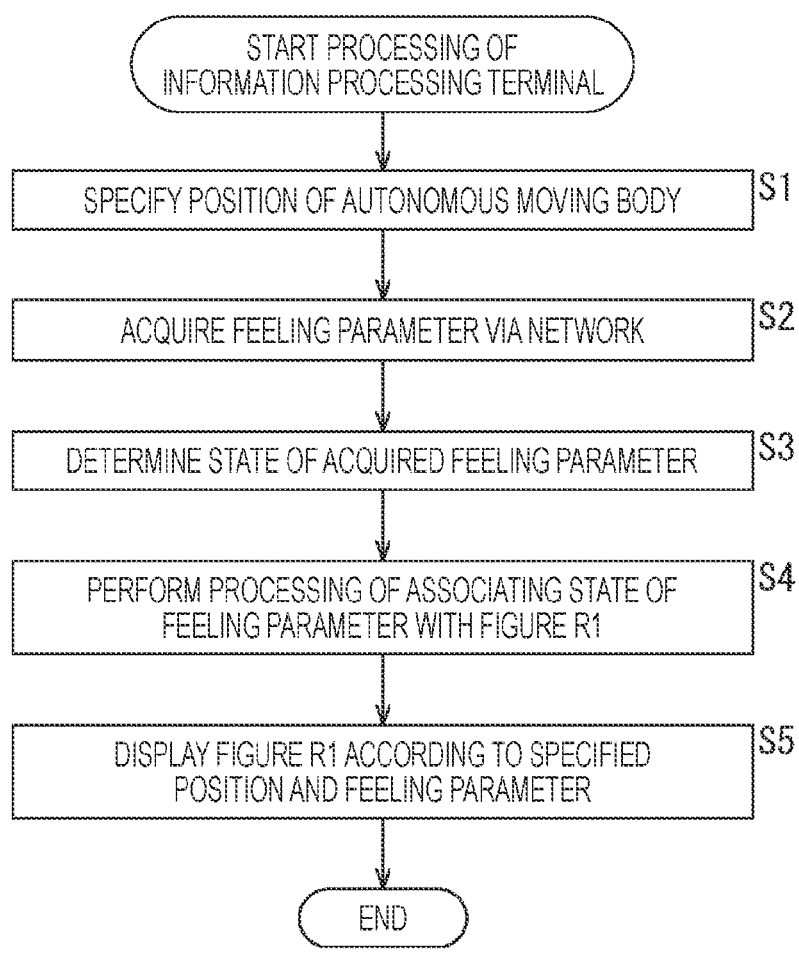
FIG. 27 is a flowchart illustrating processing of the information processing terminal.

Next, a procedure in which the information processing terminal 30 realizes the above-described display example (irradiation example/projection example) will be described with reference to a flowchart of FIG. 27.

In step S1, the information processing terminal 30 specifies the position of the autonomous moving body 10 sensed by the sensor unit. In step S2, the information processing terminal 30 acquires the feeling parameter stored in the autonomous moving body 10 (or the feeling parameter stored in the information processing server 20) via the network. In step S3, the information processing terminal 30 determines the state (type and value) of the acquired feeling parameter.

In step S4, the information processing terminal 30 performs processing of associating the state (type and value) of the feeling parameter with the figure R1, as described with reference to FIGS. 22 and 23. For example, the information processing terminal 30 determines whether to display colors in a single color or to display colors in a gradation by combining a plurality of colors. In a case where displaying in a single color, the figure R1 is displayed in the form and color corresponding to the feeling parameter having the largest value. In a case where displaying in a plurality of colors, it is also determined whether or not to associate the figure R1 using the pair of feelings. In a case where the pair of feelings is used, the feeling parameter to be displayed is selected by setting the pair of feelings as described with reference to FIG. 23. In a case where the pair of feelings is not used, for example, feeling parameters as targets to be displayed are selected in descending order of values of the feeling parameters.

In step S5, the information processing terminal 30 displays the figure R1 on the display screen according to the specified position and feeling parameter.

<<Computer Configuration Example>>

The above-described series of processing can be executed by hardware or software. In a case where the series of processing is executed by software, a program constituting the software is installed in a computer. Here, the computer includes a microcomputer incorporated in dedicated hardware, a general-purpose personal computer for example capable of executing various functions by installing various programs, and the like.

FIG. 28 is a block diagram illustrating a configuration example of hardware of a computer that executes the series of processing described above by a program.

In the computer, a central processing unit (CPU) 1001, a read-only memory (ROM) 1002, and a random access memory (RAM) 1003 are mutually connected by a bus 1004.

An input/output interface 1005 is further connected to the bus 1004. An input unit 1006, an output unit 1007, a storage unit 1008, a communication unit 1009, and a drive 1010 are connected to the input/output interface 1005.

The input unit 1006 includes a keyboard, a mouse, a microphone, a touch panel, an input terminal, and the like. The output unit 1007 includes a display, a speaker, an output terminal, and the like. The storage unit 1008 includes a hard disk, a RAM disk, a nonvolatile memory, and the like. The communication unit 1009 includes a network interface and the like. The drive 1010 drives a removable recording medium 1011 such as a magnetic disk, an optical disk, a magneto-optical disk, and a semiconductor memory.

In the computer configured as described above, for example, the CPU 1001 loads a program stored in the storage unit 1008 into the RAM 1003 via the input/output interface 1005 and the bus 1004 and executes the program, whereby the above-described series of processing is performed. The RAM 1003 also appropriately stores data and the like required for the CPU 1001 to execute various processes.

The program executed by the computer (CPU 1001) can be provided by being recorded in the removable recording medium 1011 as a package medium or the like, for example. Furthermore, the program can be provided via wired or wireless transmission media such as a local area network, the Internet, or digital satellite broadcasting.

In the computer, the program can be installed in the storage unit 1008 via the input/output interface 1005 by attaching the removable recording medium 1011 to the drive 1010. Furthermore, the program can be received by the communication unit 1009 via a wired or wireless transmission medium and installed in the storage unit 1008. In addition, the program can be installed in the ROM 1002 or the storage unit 1008 in advance.

Note that the program executed by the computer may be a program in which processing is performed in time series along with the order described in the present specification or may be a program in which processing is performed in parallel or at required timing such as when being called.

In the present specification, a system means a set of a plurality of components (apparatuses, modules (parts), and the like), and it does not matter whether or not all the components are in the same housing. Therefore, a plurality of apparatuses housed in separate housings and connected via a network and one apparatus in which a plurality of modules is housed in one housing are both systems.

The embodiments of the present disclosure are not limited to the above-described embodiments, and various modifications can be made without departing from the gist of the present disclosure.

For example, a form in which some parts of the above-described embodiments are appropriately combined can be adopted.

For example, the present disclosure can have a configuration of cloud computing in which one function is shared and processed in cooperation by a plurality of apparatuses via a network.

Note that the effects described in the present specification are merely examples and are not limited, and effects other than those described in the present specification may be provided.

REFERENCE SIGNS LIST

10 Autonomous moving body
20 Information processing server
30 Information processing terminal
110 Input unit
120 Recognition unit
130 Learning unit
140 Action planning unit
150 Operation control unit
160 Drive unit
170 Output unit
210 Learning unit
220 Action recommendation unit
230 Analysis unit
240 Storage unit
250 Application control unit
260 Reflection unit
270 Terminal communication unit
310 Input unit
320 Display unit
330 Audio output unit
340 Control unit
350 Communication unit
1001 CPU
1002 ROM
1003 RAM
1006 Input unit
1007 Output unit
1008 Storage unit
1009 Communication unit
1010 Drive

The invention claimed is:

1. An information processing apparatus comprising
a control unit configured to cause, according to a change in a position of an autonomous moving body sensed by a sensing unit configured to sense the position of the autonomous moving body and a change in a feeling parameter indicating a feeling of the autonomous moving body, a display screen to display a figure corresponding to the autonomous moving body while changing a state of the figure,
wherein the change in the feeling parameter includes a change in at least one feeling parameter of a plurality of feeling parameters of the autonomous moving body,
wherein the display screen displays the figure based on a ratio of values of the plurality of feeling parameters of the autonomous moving body, and
wherein the control unit is implemented via at least one processor.

2. The information processing apparatus according to claim 1,
wherein the control unit causes the display screen to display the figure while changing a display position and a display state of the figure corresponding to the autonomous moving body.

3. The information processing apparatus according to claim 2,
wherein the control unit causes the display screen to display the figure using a vicinity of a center with respect to the position of the autonomous moving body as a reference position of the display position.

4. The information processing apparatus according to claim 2,
wherein the control unit causes the display screen to display the figure while changing the display position centered on a reference position and the display state of the figure.

5. The information processing apparatus according to claim 2,
wherein the control unit causes the display screen to display the figure while changing a size of the figure in conjunction with the change in the feeling parameter.

6. The information processing apparatus according to claim 2,
wherein the control unit causes the display screen to display the figure while changing a color of the figure in conjunction with the change in the feeling parameter.

7. The information processing apparatus according to claim 2,
wherein the control unit causes the display screen to display the figure while changing a shape of the figure in conjunction with the change in the feeling parameter.

8. The information processing apparatus according to claim 7,
wherein the figure is circular form, and
wherein the control unit causes the display screen to display the figure while changing a shape of the circular form in conjunction with the change in the feeling parameter.

9. The information processing apparatus according to claim 7,
wherein the figure is circular in form, and
wherein the control unit causes the display screen to display the figure while changing a size and a color of the circular form in conjunction with the change in the feeling parameter.

10. The information processing apparatus according to claim 7,
wherein the figure is circular in form, and
wherein the control unit causes the display screen to display the figure while changing a size of the circular form in conjunction with the change in the feeling parameter.

11. The information processing apparatus according to claim 7,
wherein the figure is in circular form, and
wherein the control unit causes the display screen to display the figure while changing a color of the circular form in conjunction with the change in the feeling parameter.

12. The information processing apparatus according to claim 1,
wherein the control unit causes the display screen to display the figure while changing the state of the figure using a temporally equal interval as a stable interval.

13. The information processing apparatus according to claim 1,
wherein the control unit causes the display screen to display the figure while changing the state of the figure in conjunction with an interval that the feeling parameter temporally changes.

14. The information processing apparatus according to claim 1,
wherein the feeling parameter is changed according to an action performed by a user on the autonomous moving body, and
wherein the control unit causes the display screen to display the figure while changing the state of the figure according to the feeling parameter changed according to the action.

15. The information processing apparatus according to claim 1,
wherein in the feeling parameter, the feeling of the autonomous moving body and the state of the figure are associated as a feeling correspondence relation, and
wherein the control unit causes the display screen to display the figure while changing the state of the figure in accordance with the feeling correspondence relationship.

16. The information processing apparatus according to claim 15,
wherein the feeling parameter constitutes a pair of feelings in which two feeling parameters pair up, and
wherein the control unit causes the display screen to display the figure while changing the state of the figure in accordance with one feeling parameter constituting the pair of feelings.

17. The information processing apparatus according to claim 15,
wherein the control unit causes the display screen to display a name of a feeling of the feeling parameter and a value of the feeling parameter while rotating the name and the value as a frame surrounding the figure.

18. An information processing method performed by an information processing apparatus, the method comprising:
causing, according to a change in a position of an autonomous moving body sensed by a sensing unit configured to sense the position of the autonomous moving body and a feeling parameter indicating a feeling of the autonomous moving body, a display screen to display a figure corresponding to the autonomous moving body while changing a state of the figure,
wherein the feeling parameter includes at least one feeling parameter of a plurality of feeling parameters of the autonomous moving body, and
wherein the display screen displays the figure based on a ratio of values of the plurality of feeling parameters of the autonomous moving body.

19. An information processing apparatus comprising;
a projection adjustment unit configured to adjust, according to a change in a position of an autonomous moving body sensed by a sensing unit configured to sense the position of the autonomous moving body and a feeling parameter indicating a feeling of the autonomous moving body, projection light to be projected onto the autonomous moving body while changing a state of a figure corresponding to the autonomous moving body,
wherein the feeling parameter includes at least one feeling parameter of a plurality of feeling parameters of the autonomous moving body,
wherein the projection light is projected onto the autonomous moving body based on a ratio of values of the plurality of feeling parameters of the autonomous moving body, and
wherein the projection adjustment unit is implemented via at least one processor.

20. An information processing method performed by an information processing apparatus, the method comprising:
adjusting, according to a change in a position of an autonomous moving body sensed by a sensing unit configured to sense the position of the autonomous moving body and a feeling parameter indicating a feeling of the autonomous moving body, projection light to be projected onto the autonomous moving body while changing a state of a figure corresponding to the autonomous moving body,
wherein the feeling parameter includes at least one feeling parameter of a plurality of feeling parameters of the autonomous moving body, and
wherein the projection light is projected onto the autonomous moving body based on a ratio of values of the plurality of feeling parameters of the autonomous moving body.

* * * * *